US007463000B2

(12) United States Patent
Akiyama

(10) Patent No.: US 7,463,000 B2

(45) Date of Patent: Dec. 9, 2008

(54) MOTOR CONTROLLING METHOD, MOTOR CONTROLLING APPARATUS, AND RECORDING APPARATUS

(75) Inventor: Shigeki Akiyama, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 201 days.

(21) Appl. No.: 11/477,603

(22) Filed: Jun. 30, 2006

(65) Prior Publication Data

US 2007/0002113 A1 Jan. 4, 2007

(30) Foreign Application Priority Data

Jun. 30, 2005 (JP) ............................ 2005-191947

(51) Int. Cl.
*H02P 5/00* (2006.01)
*H02P 8/00* (2006.01)

(52) U.S. Cl. ......................... 318/560; 318/561; 318/66; 318/610; 347/14; 347/105

(58) Field of Classification Search ................. 318/561, 318/66, 799, 280, 601, 626, 114, 610; 358/1.15, 358/1.13; 375/240.12; 271/110
See application file for complete search history.

(56) References Cited

U.S. PATENT DOCUMENTS

| | | | | |
|---|---|---|---|---|
| 6,285,145 | B1 * | 9/2001 | Otsubo et al. | 318/114 |
| 6,812,668 | B2 * | 11/2004 | Akiyama | 318/610 |
| 7,135,831 | B2 * | 11/2006 | Akiyama | 318/601 |
| 7,176,649 | B2 * | 2/2007 | Shoji et al. | 318/626 |
| 2003/0178958 | A1 * | 9/2003 | Akiyama | 318/280 |
| 2006/0022401 | A1 * | 2/2006 | Akiyama et al. | 271/265.01 |
| 2006/0023051 | A1 * | 2/2006 | Akiyama et al. | 347/104 |
| 2006/0076920 | A1 * | 4/2006 | Muroi et al. | 318/799 |
| 2006/0113931 | A1 * | 6/2006 | Akiyama | 318/66 |
| 2007/0035760 | A1 * | 2/2007 | Hachiro et al. | 358/1.13 |

(Continued)

FOREIGN PATENT DOCUMENTS

| | | |
|---|---|---|
| JP | 7-210206 | 8/1995 |

*Primary Examiner*—Paul Ip
(74) *Attorney, Agent, or Firm*—Banner & Witcoff, LTD.

(57) ABSTRACT

A method of controlling, by an adaptive control method, an electric motor as a drive source of an operating apparatus that operates, based on a driving force produced by the electric motor, under an arbitrary one of a plurality of operating conditions, and exhibits different dynamic characteristics corresponding to the plurality of operating conditions. The method includes preparing, for a control portion controlling the electric motor, a plurality of control-parameter groups which correspond to the plurality of operating conditions, respectively, and each group of which includes at least one control parameter comprising at least one adjustable parameter, determining, based on one of the control-parameter groups that corresponds to the arbitrary one of the operating conditions, and a plurality of target control outputs of the operating apparatus that correspond to a plurality of times, respectively, a plurality of control inputs to be inputted to the electric motor at the plurality of times, respectively, and adjusting, while the operating apparatus operates under one of the operating conditions that corresponds to each one of the control-parameter groups, the at least one adjustable parameter of the each control-parameter group in a direction in which an actual control-output trajectory including a plurality of actual control outputs of the operating apparatus that correspond to the plurality of control inputs, respectively, approaches a target control-output trajectory including the plurality of target control outputs of the operating apparatus.

24 Claims, 19 Drawing Sheets

U.S. PATENT DOCUMENTS

| | | | | |
|---|---|---|---|---|
| 2007/0257418 | A1* | 11/2007 | Tsukamoto et al. | 271/110 |
| 2008/0002766 | A1* | 1/2008 | Suwa et al. | 375/240.12 |
| 2008/0043285 | A1* | 2/2008 | Nakagiri et al. | 358/1.15 |

* cited by examiner

MOTOR CONTROLLING METHOD, MOTOR CONTROLLING APPARATUS, AND RECORDING APPARATUS

The present application is based on Japanese Patent Application No. 2005-191947 filed on Jun. 30, 2005, the contents of which are incorporated herein by reference.

BACKGROUND OF THE INVENTION

1. Field of the Invention

The present invention relates to a method of controlling an electric motor while adjusting at least one control parameter under each one of a plurality of operating conditions; a motor controlling apparatus for controlling an electric motor in this method; and a recording apparatus that includes a recording head, a carriage on which the recording head is mounted, and this motor controlling apparatus used to move the carriage.

2. Discussion of Related Art

There has conventionally been known a controlling system including a controller that obtains, using at least one control parameter, operating amounts each to be applied to an electric motor so as to operate it and thereby drive an object. In addition, there has conventionally been known a controlling method in which at least one control parameter used by a controller to obtain operating amounts is not fixed but is changed as time elapses while an electric motor is operated at each of the obtained operating amounts so as to drive an object.

More specifically described, while the object is driven by the electric motor, the control parameter is adjusted, at each of appropriate timings, such that a driven amount of the object accurately follows a target driven-amount trajectory, for example, once the driven amount of the object deviates from the target trajectory, the deviation eventually disappears. This adjustment of the control parameter can be done using a well-known adaptive control method.

FIGS. 15, 16A, and 16B show an example in which as at least one control parameter is adjusted, an actual driven amount of an object eventually coincides with a target driven-amount trajectory. FIG. 15 is a graph representing a time-wise change of an actual velocity of an object (e.g., a carriage of an image recording apparatus) when an object is iteratively driven or moved at regular intervals of time in one direction, and a corresponding target velocity trajectory. FIG. 16A is an enlarged view of a first portion of the graph of FIG. 15 that corresponds to a time period from 0.4 second to about 2.0 seconds; and FIG. 16B is an enlarged view of a second portion of the graph of FIG. 15 that corresponds to a time period from 22.4 seconds to about 24 seconds.

As shown in FIGS. 15 and 16A, since when the movement of the object begins, the adjustment of the control parameter begins, the actual velocity of the object largely deviates, at the beginning, from the target velocity trajectory. However, as time elapses, the control parameter is iteratively adjusted to converge to an appropriate value, i.e., a convergent value corresponding to an actual operating condition (i.e., a dynamic characteristic) of the image recording apparatus. Thus, as shown in FIGS. 15 and 16B, eventually, the actual velocity of the object substantially follows the target velocity trajectory. The convergent value of the control parameter reflects the actual operating condition (the dynamic characteristic) of the image recording apparatus at that time. Therefore, so long as the dynamic characteristic does not change, the object can be driven, using the adjusted control parameter (i.e., the convergent value thereof), to follow the target velocity trajectory.

Meanwhile, there is such a case where an object is driven under each one of a plurality of driving conditions corresponding to different dynamic characteristics. Even if at least one control parameter may be adjusted while the object is driven under each one of the driving conditions, the control parameter does not converge to an appropriate value. An example of this case occurs to a carriage driving system in which a carriage (i.e., an object) carrying a recording head to eject ink toward a recording medium (e.g., a recording sheet) is connected to a portion of an endless belt wound on two pulleys, and one (i.e., a drive pulley) of the two pulleys is rotated by an electric motor, to drive or move linearly the carriage between the two pulleys.

In the above-indicated carriage driving system, when the electric motor is rotated in one direction (i.e., a forward direction), the carriage is moved from the drive pulley toward the other (driven) pulley; and when the motor is rotated in the opposite direction (i.e., a backward direction), the carriage is moved from the follower pulley toward the drive pulley. Thus, the carriage is reciprocated between the two pulleys.

In the carriage driving system constructed as described above, when a controller controls or operates the motor to drive or move the carriage as the object, the carriage (or the carriage driving system) exhibits different dynamic characteristics that correspond to (a) a first driving condition that the carriage is moved in one direction corresponding to the forward rotation direction of the motor and (b) a second driving condition that the carriage is moved in the opposite direction corresponding to the backward rotation direction of the motor. The different dynamic characteristics of the carriage can be said as different dynamic characteristics of an object(s) controlled by the controller, i.e., a combination of the motor and the carriage. Thus, when the single motor as a drive source of the carriage driving system is rotated in the different directions, the motor appears, to the controller, to behave as if the motor drove different carriages, that is, the combination of the motor and the carriage appears, to the controller, to behave as if the controller controlled different combinations of motors and carriages.

In order that the carriage having the different dynamic characteristics corresponding to the different movement directions may be so driven or moved as to follow the target velocity trajectory, the control parameter is adjusted while the carriage is moved. More specifically described, when the carriage is moved in one direction, the control parameter is adjusted to converge to a first convergent value suitable for the dynamic characteristic corresponding to the one direction; and when the carriage is moved in the opposite direction, the control parameter is adjusted to converge to a second convergent value suitable for the dynamic characteristic corresponding to the opposite direction. Since the first and second convergent values differ from each other, the control parameter is oscillated between the two convergent values as the carriage is iteratively reciprocated between the two pulleys.

That is, each time the carriage changes its movement directions, it also changes its dynamic characteristics. Therefore, the control parameter converges alternately to the two convergent values, and does not converge to a single convergent value even in a long time duration. That is, the control parameter continues to change or oscillate between the two convergent values. If the control parameter does not converge to a single convergent value even in a long time duration, the time-wise change of the actual velocity of the carriage does not coincide with the target velocity trajectory, as shown in FIGS. 17, 18A, and 18B. Thus, the carriage cannot be driven in an appropriate manner and accordingly the recording head mounted on the carriage cannot record an excellent image on the recording medium.

FIG. 17 is a graph representing a time-wise change of an actual velocity of an object (e.g., a carriage) when the object is iteratively driven or moved at regular intervals of time in each of opposite directions, and a corresponding target velocity trajectory. FIG. 18A is an enlarged view of a first portion of the graph of FIG. 17 that corresponds to a time period from 0.4 second to about 2.0 seconds; and FIG. 18B is an enlarged view of a second portion of the graph of FIG. 17 that corresponds to a time period from 22.4 seconds to about 24 seconds. As shown in those figures, each time the object changes its movement directions, it also changes its dynamic characteristics, so that a control parameter does not converge to a single convergent value. That is, the control parameter does not converge to any appropriate values corresponding to the different movement directions, so that the time-wise change of the actual velocity of the carriage does not coincide with the target velocity trajectory even in a long time duration.

In the above-described carriage driving apparatus as an operating apparatus, the carriage (or the carriage driving apparatus as a whole) changes its dynamic characteristics not only when the carriage is moved in the different directions but also because of secular variation. For example, Japanese Patent Application Publication No. 7(1995)-210216 discloses a moving apparatus that may be used as a recording-head moving apparatus of a printer and that changes its characteristic (i.e., its transfer function) because of secular variation. In order to prevent the moving apparatus from becoming unable to stop an object at a target position after accelerating or decelerating it, a control parameter is adaptively changed.

The adaptive changing of the control parameter is carried out as follows: A disconnecting device is employed that can disconnect a drive pulley and an endless belt of the moving apparatus from each other. First, using the disconnecting device, the endless belt is disconnected from the drive pulley, and a rotary portion of the moving apparatus is identified. Next, in a state in which the endless belt is connected to the drive pulley, the moving apparatus is identified by utilizing the result obtained by the identification of the rotary portion. Then, based on the respective results obtained by the identification of the rotary portion and the identification of the moving apparatus, an optimum waveform (i.e., an operating amount) to be inputted to the of the moving apparatus is obtained. This changing of the control parameter is carried out at a predetermined period, or as needed. Thus, even if the characteristic of the moving apparatus may change because of secular variation, the printer can maintain its excellent recording quality.

SUMMARY OF THE INVENTION

According to the method, disclosed by the above-indicated patent document, in which the control parameter is adaptively changed, the control parameter may be adjusted to a value corresponding to a characteristic of an object controlled (or a dynamic characteristic of an object driven) at that time. However, it is difficult, and is not practical, to apply this method to the adjustment of the control parameter when the carriage is moved in the different directions.

More specifically explained, in the disclosed method, the employment of the disconnecting device is needed for the purpose of changing adaptively the control parameter. In addition, use of special signals is needed for the purpose of identifying the rotary portion and the moving apparatus. These special features lead to increasing the size and cost of the printer.

Moreover, the adjustment of the control parameter needs a long time because first the endless belt is disconnected from the drive pulley by the disconnecting device so as to identify the rotary portion, then the endless belt is connected again to the drive pulley so as to identify the moving apparatus, and finally the control parameter is adjusted based on the respective results obtained by the identification of the rotary portion and the identification of the moving apparatus. Above all, the control parameter cannot be adjusted, while the object is driven, to an appropriate value corresponding to the characteristic of the object. That is, in the disclosed method, the control parameter can be adjusted only when the object is not driven.

Thus, it has been a demand for a motor controlling apparatus that controls an electric motor under each one of a plurality of operating conditions and that can iteratively adjust at least one control parameter while the object is driven, like in the conventional method, and can adjust the control parameter to an appropriate value corresponding to the each operating condition.

In the above-described technical background, the present invention has been developed. It is therefore an object of the present invention to solve at least one of the above-indicated problems. It is another object of the present invention to provide the art of adjusting, even in the case where an operating apparatus operates under each one of a plurality of operating conditions, a control parameter to an appropriate value corresponding to the each operating condition, while an electric motor as a drive source of the operating apparatus is operated, so that the motor can be appropriately controlled under the each operating condition.

According to a first aspect of the present invention, there is provided a method of controlling an electric motor as a drive source of an operating apparatus by an adaptive control method. The operating apparatus operates, based on a driving force produced by the electric motor, under an arbitrary one of a plurality of operating conditions, and exhibits a plurality of different dynamic characteristics corresponding to the plurality of operating conditions, respectively. The method comprises preparing, for a control portion controlling the electric motor, a plurality of control-parameter groups which correspond to the plurality of operating conditions, respectively, and each group of which includes at least one control parameter comprising at least one adjustable parameter, determining, based on one of the control-parameter groups that corresponds to the arbitrary one of the operating conditions, and a plurality of target control outputs of the operating apparatus that correspond to a plurality of times, respectively, a plurality of control inputs to be inputted to the electric motor at the plurality of times, respectively, and adjusting, while the operating apparatus operates under one of the operating conditions that corresponds to each one of the control-parameter groups, the at least one adjustable parameter of the each control-parameter group in a direction in which an actual control-output trajectory including a plurality of actual control outputs of the operating apparatus that correspond to the plurality of control inputs, respectively, approaches a target control-output trajectory including the plurality of target control outputs of the operating apparatus.

The present motor controlling method does not employ, for the purpose of controlling the electric motor, a single adjustable parameter, but employs a plurality of adjustable parameters corresponding to a plurality of different operating conditions, respectively. For example, with respect to the above-indicated carriage driving system, the motor controlling method may employ two adjustable parameters corresponding to the two directions in which the carriage is driven or moved.

The motor controlling method selects one of the plurality of adjustable parameters that corresponds to a current one of the plurality of operating conditions, and uses the selected adjustable parameter in obtaining (e.g., calculating) a plurality of control inputs each to operate the electric motor, while adjusting the selected adjustable parameter in a state in which the motor is being operated.

That is, when the operating apparatus operates under an arbitrary one of the plurality of operating conditions, the motor controlling method selects one of the plurality of adjustable parameters that corresponds to the arbitrary operating condition, uses the selected adjustable parameter in obtaining the control inputs, while adjusting the selected adjustable parameter, and controls or operates the electric motor according to each of the obtained control inputs. When the current operating condition has been changed to another or new operating condition, for example, when the carriage has changed its movement directions in the above-indicated carriage driving system, the current adjustable parameter that has been used and adjusted is replaced with another or new adjustable parameter corresponding to the new operating condition, so that the new adjustable parameter is used, while being adjusted, in obtaining control inputs each to operate the motor.

In the motor controlling method in accordance with the first aspect of the present invention, each one of the plurality of adjustable parameters respectively corresponding to the plurality of operating conditions is used when the operating apparatus operates under a corresponding one of the operating conditions, and is adjusted under the corresponding operating condition. That is, each of the adjustable parameters can be adjusted (e.g., converged) with reliability under the corresponding operating condition, and accordingly the operating apparatus can operate (or the electric motor can be controlled or operated) in an appropriate manner.

According to a second aspect of the present invention, there is provided a motor controlling apparatus for controlling an electric motor as a drive source of an operating apparatus by an adaptive control. The operating apparatus operates, based on a driving force produced by the electric motor, under an arbitrary one of a plurality of operating conditions, and exhibits a plurality of different dynamic characteristics corresponding to the plurality of operating conditions, respectively. The apparatus comprises an adjustable-parameter memory which stores a plurality of adjustable parameters comprising at least one adjustable parameter as at least one control parameter belonging to each one of a plurality of control-parameter groups corresponding to the plurality of operating conditions, respectively, such that the at least one adjustable parameter belonging to the each control-parameter group is associated with a corresponding one of the operating conditions; a motor control portion which determines, based on one of the control-parameter groups that corresponds to the arbitrary one of the operating conditions, and a plurality of target control outputs of the operating apparatus that correspond to a plurality of times, respectively, a plurality of control inputs to be inputted to the electric motor at the plurality of times, respectively, and inputs the determined control inputs to the electric motor at the respective times; and a parameter adjusting portion which adjusts, while the operating apparatus operates under the one of the operating conditions that corresponds to the each control-parameter group, the at least one adjustable parameter of the each control-parameter group in a direction in which an actual control-output trajectory including a plurality of actual control outputs of the operating apparatus that correspond to the plurality of control inputs, respectively, approaches a target control-output trajectory including the plurality of target control outputs of the operating apparatus.

In the present motor controlling apparatus, each one of the plurality of adjustable parameters respectively corresponding to the plurality of operating conditions is used in obtaining the control inputs, under a corresponding one of the operating conditions, and is adjusted by the parameter adjusting portion under the corresponding operating condition. That is, each of the adjustable parameters can be adjusted (e.g., converged) with reliability under the corresponding operating condition, and accordingly the operating apparatus can operate (or the electric motor can be controlled or operated) in an appropriate manner.

According to a third aspect of the present invention, there is provided an operating apparatus, comprising the motor controlling apparatus according to the second aspect of the present invention; an electric motor which is controlled by the motor controlling apparatus; a drive pulley which is driven by the electric motor; a follower pulley; an endless transmission member which is wound on the drive pulley and the follower pulley; a driven portion which is connected to a portion of the endless transmission member and which is reciprocated when the electric motor is rotated in a forward direction and a backward direction.

In the case where the driven portion connected to the endless belt transmission member is reciprocated between the two pulleys, the operating apparatus exhibits different dynamic characteristics corresponding to the two directions in which the driven portion is driven or moved (e.g., the two directions in which the electric motor is rotated).

The present operating employs the two adjustable parameters corresponding to the two directions in which the driven portion is driven or moved. Thus, each of the two adjustable parameters respectively corresponding to the two directions can be adjusted to an appropriate value suitable for a corresponding one of the two dynamic characteristics, and accordingly the driven portion can be driven in an appropriate manner.

According to a fourth aspect of the present invention, there is provided a recording apparatus, comprising the motor controlling apparatus according to the second aspect of the present invention; a carriage; a carriage moving device which includes, as a drive source thereof, an electric motor that is controlled by the motor controlling apparatus, and which reciprocates the carriage in a main scan direction; a medium feeding device which feeds a recording medium in a sub-scan direction perpendicular to the main scan direction; and a recording head which is mounted on the carriage and which records an image on the recording medium while being moved in the main scan direction. The operating conditions include a first operation of the electric motor to cause the carriage moving device to move the carriage in one of opposite directions of the main scan direction, and a second operation of the electric motor to cause the carriage moving device to move the carriage in an other of the opposite directions.

The present recording apparatus employs the two adjustable parameters corresponding to the two directions in which the carriage is driven or moved. Thus, each of the two adjustable parameters corresponding to the two directions can be adjusted to an appropriate value, and accordingly the carriage can be driven in an appropriate manner. Therefore, the present recording apparatus can continue to record excellent images on recording media.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described preferred embodiments of the present invention by reference to the drawings.

First Embodiment

Figure 1:
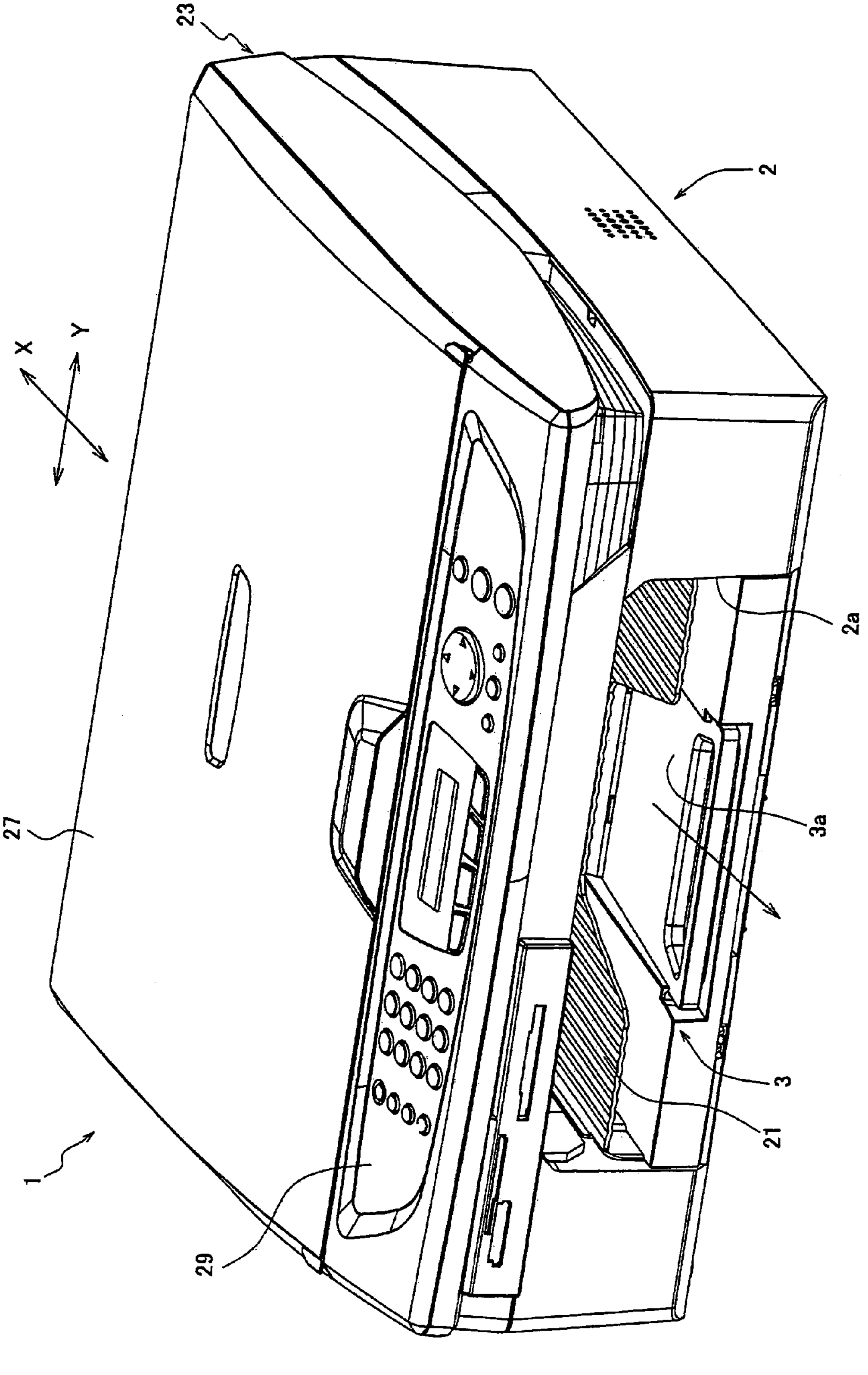
FIG. 1 is a perspective view of a multiple-function device (MFD) to which the present invention is applied.
Figure 2:
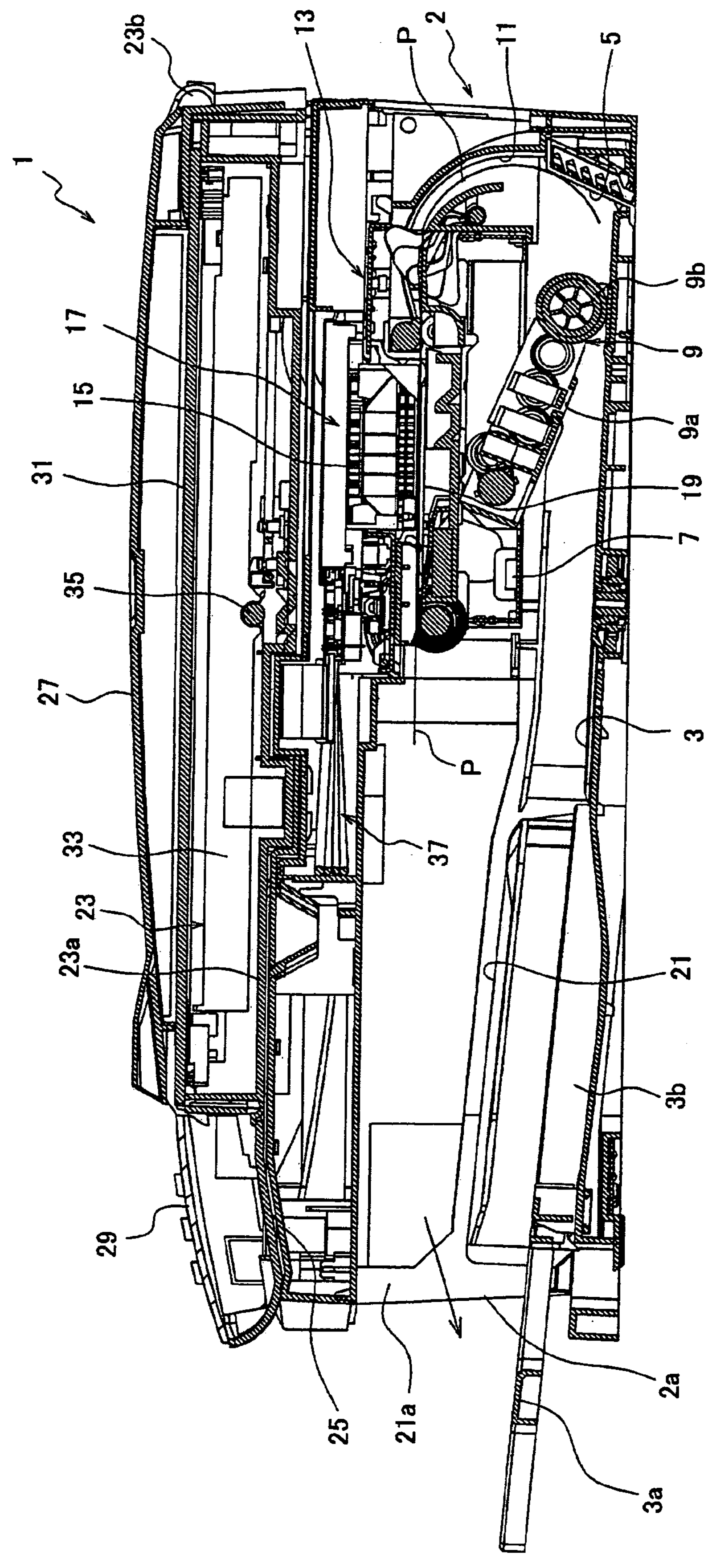
FIG. 2 is a cross-sectional view of the MFD.

FIGS. 1 and 2 show a multiple-function device (MFD) 1 to which the present invention is applied. The MFD 1 has a printer function, a copier function, a scanner function, and a facsimile-machine function. The MFD 1 includes a housing 2 formed of a synthetic resin; and a sheet cassette 3 that is insertable into a bottom portion of the housing 2 via a front opening 2*a* thereof.

The sheet cassette 3 has a construction assuring that the cassette 3 can accommodate a plurality of cut sheets, P, such as A4-size sheets or legal-size sheets, each as a recording medium, such that the cut sheets P are stacked on each other and respective short sides of the sheets P extend in a direction (i.e., a main scan direction or a Y direction) perpendicular to a sheet-feed direction (i.e., a sub-scan direction or an X direction).

The sheet cassette 3 includes an auxiliary support member 3*a* that is provided in a front portion of the cassette 3, such that the auxiliary support member 3*a* is movable in the X direction. The auxiliary support member 3*a* is for supporting rear end portions of long cut sheets P such as legal-size sheets. FIG. 2 shows a state in which the auxiliary support member 3*a* is held at a drawn position thereof where a portion of the support member 3*a* projects out of the housing 2. However, when cut sheets P, such as A4-size sheets, that can be accommodated by a main portion 3*b* of the sheet cassette 3 are used, the auxiliary support member 3*a* can be retracted into the main portion 3*b* of the cassette 3.

In addition, the sheet cassette 3 has, in a rear end portion thereof, an inclined sheet-separate plate 5 that separates a leading end of each cut sheet P from the other cut sheets P. The MFD 1 employs a box-like main frame 7 that is formed of a metal plate and includes a bottom portion to which an arm 9*a* of a sheet supplying portion 9 is connected, at an upper end portion thereof, such that the arm 9*a* is pivotable upward and downward. A sheet supplying roller 9*b* is supported by a lower end portion of the sheet supplying arm 9*a*. The sheet supplying portion 9 cooperates with the sheet-separate member 5 to separate and feed, one by one, the cut sheets P stacked in the sheet cassette 3, i.e., separate the top sheet P from the remaining sheets P and supply the separated sheet P out of the cassette 3. The separated sheet P is fed through a curved sheet guide 11 defining a U-turn path that is initially oriented upward and then obliquely frontward toward an image recording portion 13 provided at a position higher than the sheet cassette 3. The U-turn path constitutes a portion of a sheet feeding path.

The image recording portion 13 includes a carriage 17 that supports and carries an ink-jet recording head 15, and is reciprocated in the main scan direction under control of a CPU (central processing unit) 51, described later. When the carriage 17 is moved in the main scan direction, the ink-jet recording head 15, mounted on the carriage 17, is moved relative to the cut sheet P being stopped under the head 15, while the head 15 ejects droplets of ink toward the sheet P and thereby forms images on the sheet P. The cut sheet P is supported by a platen 19 that is provided below the ink-jet recording head 15 and constitutes another portion of the sheet feeding path. That is, the ink-jet recording head 15 is provided at a position right above the platen 19, and records images on the cut sheet P supported on the platen 19.

A sheet discharging portion 21 receives each cut sheet P having, on an upper surface thereof, the images recorded by the image recording portion 13. The sheet discharging portion 21 is provided above the sheet cassette 3, and includes a sheet discharging opening 21*a* that opens together with the cassette-insertion opening 2*a*, in a front surface of the housing 2.

In a top portion of the housing 2, there is provided an image reading device 23 that is used for reading images from an original. The image reading device 23 is constructed such that a bottom wall 23*a* thereof can be superposed on an upper cover member 25 with substantially no spaces being left therebetween, and such that the reading device 23 is pivotable about an axis portion, not shown, located along one side of the housing 2. Thus, the image reading device 23 can be opened upward and closed downward. An original covering member 27 that can cover the original having the images and placed on an upper surface of the image reading device 23, is attached to the reading device 23 such that a rear end of the original covering member 27 is pivotable about an axis portion 23*a* located along a rear end of the reading device 23. Thus, the original covering member 27 can be opened upward and closed downward.

In the top portion of the housing 2, an operation panel 29 is provided in front of the image reading device 23. The operation panel 29 includes various sorts of operation keys and a liquid-crystal display, as shown in FIG. 1. The image reading device 23 includes an original-support glass plate 31 that supports, on the upper surface thereof, the original and can be covered by the original covering member 27 that can be opened upward to allow the original to be placed on the glass plate 31. A contact image sensor (CIS) 33 is provided below the support glass plate 31, such that the image sensor 33 can be reciprocated along a guide shaft 35 in the main scan direction, i.e., the Y direction, so as to read the images from the original. The Y direction is perpendicular to the drawing sheet of FIG. 2.

An ink storing portion, not shown, of the MFD 1 is provided in a front portion of the housing 2, covered by the image reading device 23, and has an upper opening. The ink storing portion accommodates, for recording of full-color images, four ink cartridges that store four sorts of inks, respectively, e.g., black (Bk), cyan (C), magenta (M), and yellow inks (Y), such that each of the ink cartridges can be detachably attached through the upper opening. In the present MFD 1, the four ink cartridges are connected to the recording head 15 via respective flexible ink-supply tubes, not shown, so that the four inks are supplied from the four ink cartridges to the head 15.

Figure 3:
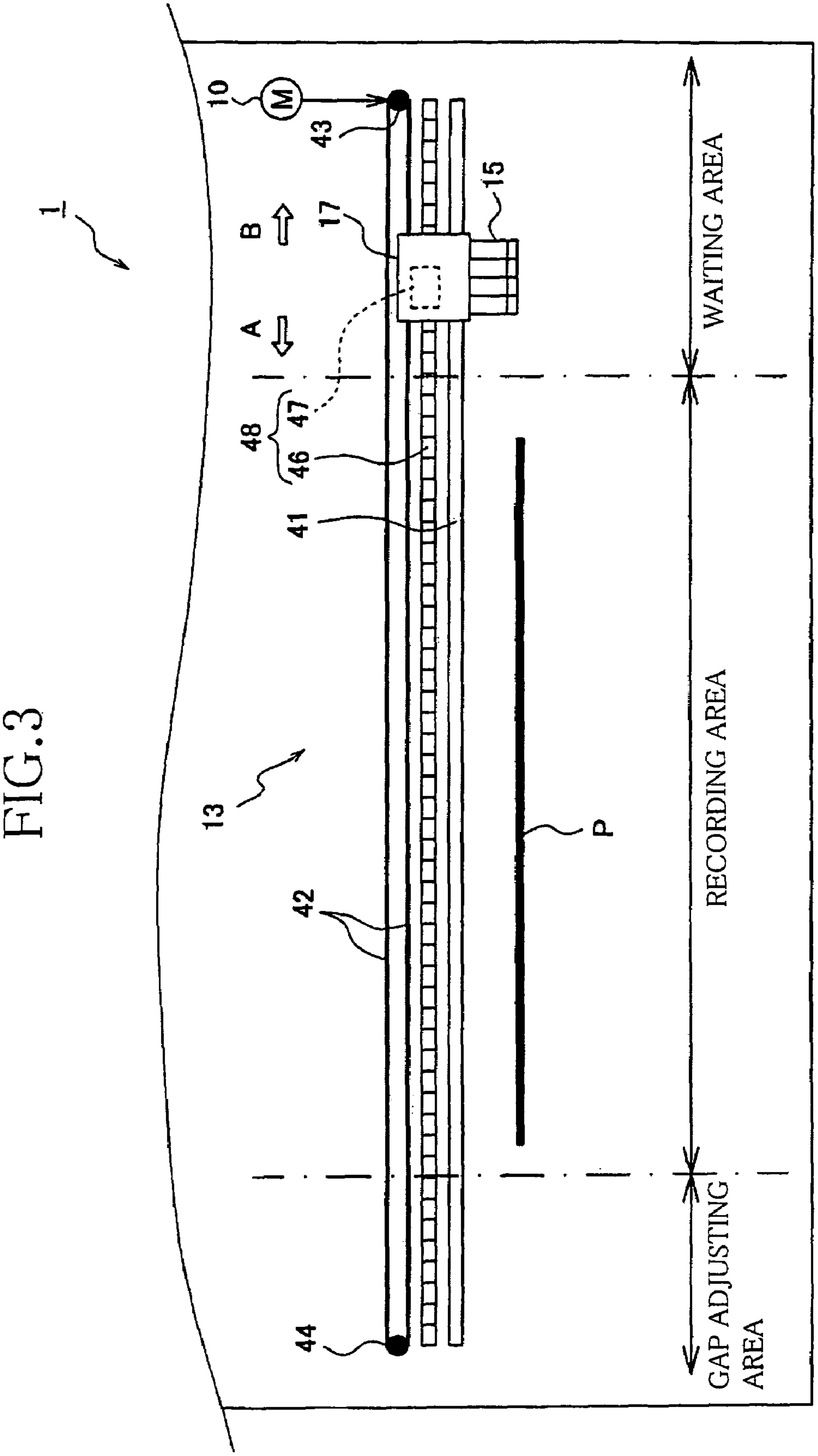
FIG. 3 is a schematic view of a construction of an image recording portion of the MFD.

Next, the image recording portion 13 of the MFD 1 will be described in more detail by reference to FIG. 3. FIG. 3 shows a carriage reciprocating portion of the image recording portion 13 that drives or reciprocates the carriage 17.

As shown in FIG. 3, the image recording portion 13 employs a guide bar 41 extending in a widthwise direction of a cut sheet P that is fed by a feeding roller, not shown. The guide bar 41 supports the carriage 17 on which the recording head 15 is mounted.

The carriage 17 is connected to a portion of an endless belt 42 extending along the guide bar 41, and the endless belt 42 is wound on a drive pulley 43 connected to a carriage (CR) motor 10 provided in the vicinity of one of opposite ends of the guide bar 41 and a follower or idle pulley 44 provided in the vicinity of the other end of the same 41.

Thus, the carriage 17 is reciprocatively driven or moved along the guide bar 41, in the widthwise direction of the cut sheet P, owing to a driving force transmitted from the CR motor 10 via the endless belt 42. Thus, the carriage 17 is moved relative to a support member of the image recording portion 13. The support member may be the housing 2 or the main frame 7 of the MFD 1.

In the vicinity of the guide bar 41, a linear scale 46 having a plurality of encoder slits formed at a regular interval of distance, is provided along the guide bar 41, i.e., along a predetermined movement path along which the carriage 17 is reciprocated.

A linear encoder (i.e., a carriage-driving-related encoder) 48 includes, in addition to the linear scale 46, a detecting portion 47 that is supported by a portion of the carriage 17 that is opposed to the linear scale 46, so that the detecting portion 47 is moved with the carriage 17. The detecting portion 47 includes a light emitting portion and a light receiving portion, not shown, that are provided on either side of the linear scale 46. The linear encoder 48 detects an amount of movement of the carriage 17.

Figure 5:
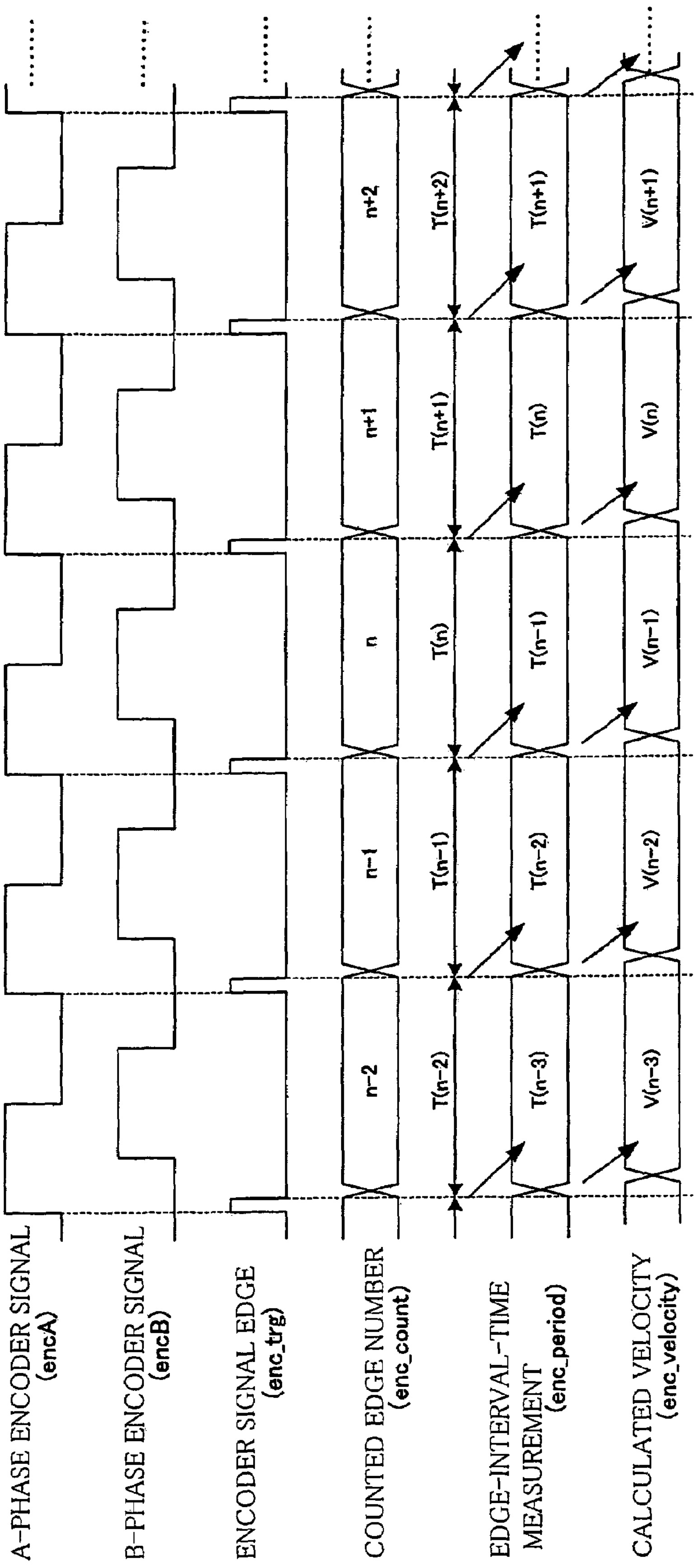
FIG. 5 is a graph showing two encoder signals and various signals derived from the encoder signals.

As shown in FIG. 5, the detecting portion 47 outputs two sorts of pulse signals that are offset from each other by a predetermined phase (in the present embodiment; one fourth of a period of each of the pulse signals), that is, outputs an A-phase encoder signal, encA, and a B-phase encoder signal, encB. When the carriage 17 is moved in a direction, A, from its home position as a right-hand end of a waiting area of the movement path, i.e., the drive pulley 43, toward the idle pulley 44, the A-phase encoder signal, encA, precedes the B-phase encoder signal, encB, by the predetermined phase; and when the carriage 17 is moved in the opposite direction, B, from the idle pulley 44 toward the home position, the B-phase encoder signal, encB, precedes the A-phase encoder signal, encA, by the predetermined phase.

FIG. 1 shows a gap adjusting area in which a gap adjusting device, not shown, is operated to adjust a gap present between nozzles of the recording head 15 and the cut sheet P supported by the platen 19.

Figure 4A:
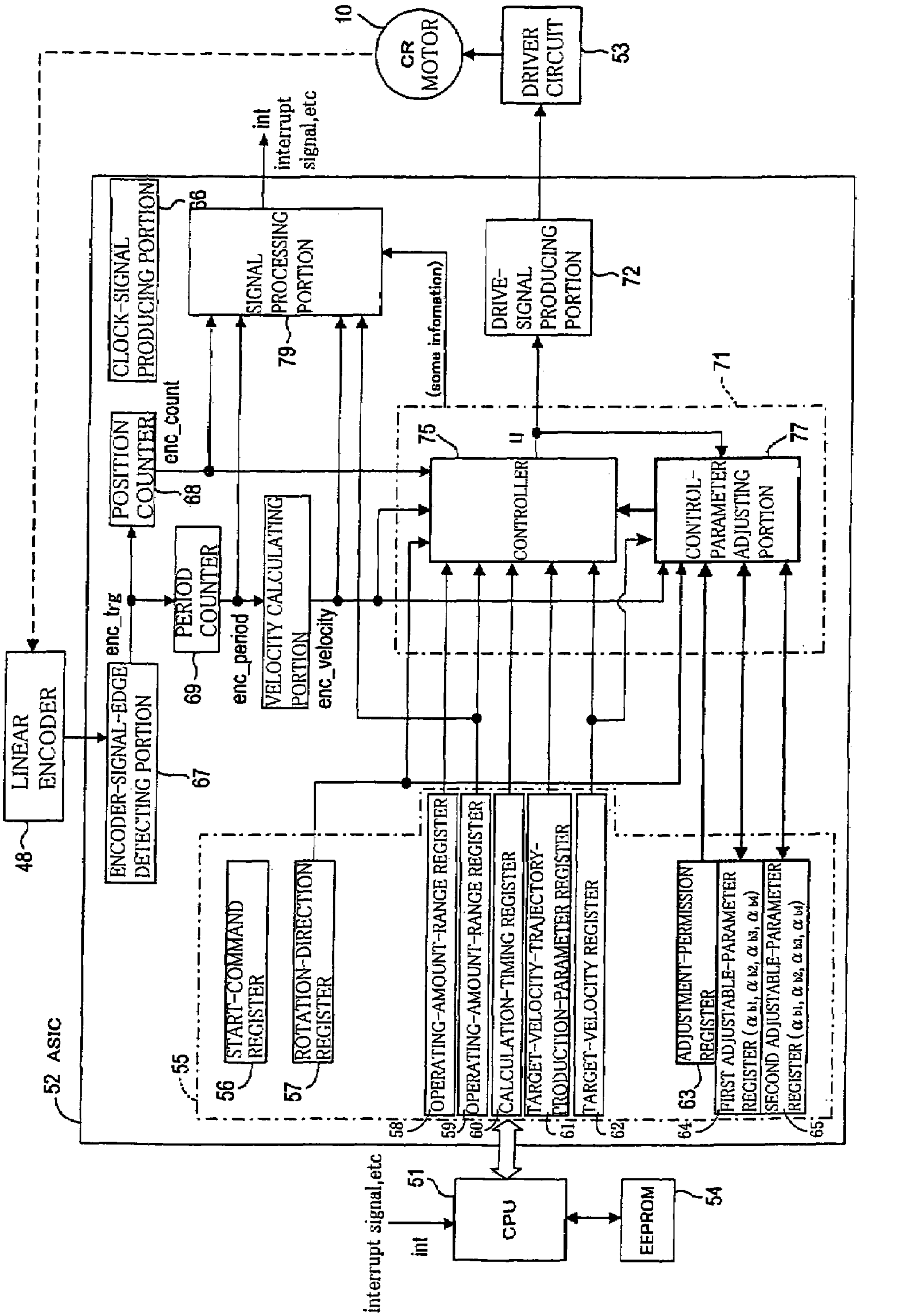
FIG. 4A is a diagrammatic view of a carriage driving and controlling apparatus that drives and controls a carriage of the image recording portion.

Various sorts of carriage driving and controlling operations, including an image recording operation, are carried out by a carriage-driving controlling device that is incorporated in the MFD 1. As shown in FIG. 4, the carriage-driving controlling device is for driving, based on a command supplied from the CPU 31 that controls the MFD 1 as a whole, the CR motor 10 as an actuator of the carriage 17. The carriage-driving controlling device includes an ASIC (application specific integrated circuit) 52 that produces a PWM (pulse width modulation) signal to control a rotation velocity and a rotation direction of the CR motor 10; a driver circuit 53 that drives the CR motor 10 based on the PWM signal produced by the ASIC 52; and an EEPROM (electrically erasable and programmable read only memory) 54 that stores control parameters that are used to calculate an operating amount as a control input to operate or control the CR motor 10.

That is, the carriage-driving controlling device, shown in FIG. 4, inputs a command to operate the CR motor 10, into the driver circuit 53, so as to control the rotation of the CR motor 10 and thereby control the movement of the carriage 17 (i.e., the reciprocative movements of the carriage 17 in the two directions A, B) via a driving-force transmitting device including the two pulleys 43, 44 and the endless belt 42.

In the following description, it is assumed that when the CR motor 10 is rotated in a forward direction, the carriage 17 is moved in the direction A and, when the CR motor 10 is rotated in a backward direction, the carriage 17 is moved in the direction B. In addition, the following description is focused on only an image recording operation as a proper operation of the MFD 1 in which the rotation of the CR motor 10 is controlled to reciprocate the carriage 17 in an image recording area, shown in FIG. 1. Thus, FIG. 4 shows only constituent elements that are needed to control the CR motor 10 in the image recording operation.

The driver circuit 53 is constituted by a well-known H bridge (Wheatstone bridge) including four switching elements (e.g., FETs, field effect transistors) and flywheel diodes that are connected in parallel to the switching elements, respectively. Supplying of an electric power to the CR motor 10 can be controlled by turning the switching elements ON and OFF according to the drive signal (i.e., the PWM signal) received from the ASIC 52.

The ASIC 52 includes a group of operation-mode registers 55 that store, under control of the CPU 51, various information needed to drive and control the CR motor 10.

The operation-mode register group 55 includes a start-command register 56 that stores a start command to start the CR motor 10; a rotation-direction register 57 that stores a rotation direction of the CR motor 10; an operating-amount-range register 58 that store upper and lower limits of a duty ratio of the PWM signal used to drive or operate the CR motor 10 (i.e., upper and lower limits of a motor operating amount, u, produced by a controller 75); a target-stop-position register 59 that stores a target stop position at which the carriage 17 is to be stopped; a calculation-timing register 60 that stores calculation timings at each of which a motor operating amount u as a control input is calculated by the controller 75; a target-velocity-trajectory-production-parameter register 61 that stores parameters of a function used by the controller 75 to produce a target velocity trajectory (i.e., a target time-wise change of velocity) according to which the carriage 17 is to be moved; a target-velocity register 62 that stores a target velocity at which the carriage 12 is to be moved; a first adjustable-parameter register 64 and a second adjustable-parameter register 65 that store a first adjustable parameter, $\alpha_a$, and a second adjustable parameter, $\alpha_b$, respectively, that are control parameters needed to control the CR motor 10 and that are adjusted, at appropriate timings, while the CR motor 10 is operated, i.e., the carriage 17 is driven or moved; and an adjustment-permission register 42 that stores a permission to adjust the first and second adjustable parameters $\alpha_a$, $\alpha_b$. All the information stored by the operation-mode register group 55 is written by the CPU 51.

The control parameters used to control the CR motor 10 include other parameters than the first and second adjustable parameters $\alpha_a$, $\alpha_b$. However, the description of the other control parameters is omitted here. When the following description refers to the control parameters, it will be focused on only the first and second adjustable parameters $\alpha_a$, $\alpha_b$.

In the present embodiment, the control parameters do not include only one adjustable parameter, but include different adjustable parameters corresponding to different dynamic characteristics of the image recording portion 13 as an image recording apparatus. In the present embodiment, the image recording portion 13 includes the CR motor 10 and the carriage 17 that is driven or moved by the CR motor 10, and exhibits different dynamic characteristics corresponding to the different directions A, B, respectively.

More specifically described, the dynamic characteristic of the image recording portion 13 under the operating condition when the CR motor 10 is rotated in the forward direction and the carriage 17 is moved in the direction A, differs from the dynamic characteristic of the image recording portion 13 under the operating condition when the CR motor 10 is rotated in the backward direction and the carriage 17 is moved in the direction B. That is, though the object driven by the CR motor 10 is the same carriage 17, the CR motor 10 appears, to the controller 75, to behave as if the motor 10 drove different objects when it is rotated in the different directions A, B, respectively.

Hence, in the present embodiment, the control parameters include the different adjustable parameters corresponding to the different dynamic characteristics of the image recording portion 13 or the different operating conditions of the same 13, respectively. That is, the first adjustable parameters $\alpha_a$ is used as an adjustable parameter for the case where the carriage 17 is moved in the direction A, i.e., the CR motor 10 is rotated in the forward direction; and the second adjustable parameters $\alpha_b$ is used as an adjustable parameter for the case where the carriage 17 is moved in the direction B, i.e., the CR motor 10 is rotated in the backward direction.

More specifically described, the first adjustable parameter $\alpha_a$ is constituted by four parameters, $\alpha_{a1}$, $\alpha_{a2}$, $\alpha_{a3}$, $\alpha_{a4}$; and the second adjustable parameter $\alpha_b$ is constituted by four parameters, $\alpha_{b1}$, $\alpha_{b2}$, $\alpha_{b3}$, $\alpha_{b4}$, as will be described later.

In addition to the above-described operation-mode register group 55, the ASIC 52 includes a clock-signal producing portion 66 that produces a clock signal whose period is sufficiently shorter than that of the encoder signals encA, encB produced by the linear encoder 48, and supplies the clock signal to each element of the ASIC 52; an encoder-signal-edge detecting portion 67, a position counter 68, a period counter 69, and a velocity calculating portion 70 that detect edges of the encoder signals encA, encB produced by the linear encoder 48 and detect or calculate, based on the detected edges, a position, and a movement velocity, of the carriage 17; a control portion 71 that calculates, based on the detection results obtained by those elements 67, 68, 69, 70 and the various parameters stored by the operation-mode register group 55, a motor operating amount u (i.e., a PWM duty ratio); a drive-signal producing portion 72 that produces, as a drive signal to drive the CR motor 10 in a duty-cycle manner, a PWM signal corresponding to the motor operating amount u calculated by the control portion 71, and supplies the PWM signal to the driver circuit 53; and a signal processing portion 79 that processes various signals produced in the ASIC 52 and outputs the thus processed signals to the CPU 51.

The encoder-signal-edge detecting portion 67 receives the encoder signals, encA, encB, shown in FIG. 5, and detects an edge of the A-phase encoder signal encA that indicates a start/end of each period thereof. In the present embodiment, the edge detecting portion 67 detects an edge of the A-phase encoder signal encA when the B-phase encoder signal encB takes a low level. Based on the detected edges of the encoder signals encA, encB, the edge detecting portion 67 detects a direction in which the CR motor 10 is rotated, i.e., the carriage 17 is driven or moved. The edge detecting portion 67 produces an edge detection signal, enc_trg, indicating detection of an edge, to each of the position counter 68 and the period counter 69.

The position counter 68 increases or decreases, depending upon the direction of rotation of the CR motor 10 (i.e., the direction of movement of the carriage 17), detected by the edge detecting portion 67, a counted edge number, enc_count, based on the edge detection signals, enc_trg, produced by the edge detecting portion 67. The counted edge number, enc_count, indicates a current position of the carriage 17 as measured from the origin (i.e., the home position) thereof. The counted edge number, enc_count, is supplied to each of the control portion 71 and the signal processing portion 79.

The period counter 69 is reset to zero, each time it receives an edge detection signal, enc_trg, from the edge detecting portion 67, and measures an elapsed (i.e., interval) time after the reception of the edge detection signal, enc_trg, by counting a number of the clock signals. The period counter 69 supplies an edge interval time, enc_period, indicating the measured elapsed time, to each of the velocity calculating portion 70 and the signal processing portion 79.

Then, the velocity calculating portion 70 calculates, in synchronism with the reception of each edge detection signal, enc_trg, a velocity of movement of the carriage 17, i.e., a detected velocity, enc_velocity (=reso/enc_period), based on a velocity-calculation resolution, reso, of the linear encoder 48 (or the linear scale 46) and a hold value, $C_{n-1}$, indicating the edge interval time, enc_period, measured by the period counter 69 during the preceding period of the A-phase encoder signal, encA.

The control portion 71 includes a control-parameter adjusting portion 77 that selects one of the first adjustable parameter $\alpha_a$, stored by the first adjustable-parameter register 64 and the second adjustable parameter $\alpha_b$, stored by the second adjustable-parameter register 65, that corresponds to the direction of movement of the carriage 17, i.e., the direction of rotation of the CR motor 10, and inputs the selected adjustable parameter ($\alpha_a$ or $\alpha_b$) to the controller 75. In addition, while the carriage 17 is moved, i.e., the CR motor 10 is operated, the control-parameter adjusting portion 77 adjusts, at appropriate timings (e.g., at a period of several hundred microseconds), the selected adjustable parameter ($\alpha_a$ or $\alpha_b$) by a model reference adaptive control (MRAC) method, described later, as one of adaptive control methods. In short, in the MRAC method, a reference model having a desirable input-and-output characteristic is prepared in advance and a control parameter is so adjusted that an output of an object to be controlled may follow an output of the reference model. The control portion 71 additionally includes the controller 75 that produces, based on the adjustable parameter ($\alpha_a$ or $\alpha_b$) inputted by the control-parameter adjusting portion 77, and other control parameters, the operating amount u used to operate the CR motor 10.

The control-parameter adjusting portion 77 selects, based on the rotation direction of the CR motor 10, stored by the rotation-direction register 57, one of the first adjustable parameter $\alpha_a$ and the second adjustable parameter $\alpha_b$, and inputs the selected adjustable parameter ($\alpha_a$ or $\alpha_b$) to the controller 75. In addition, the control-parameter adjusting portion 77 adjusts, at each of the above-indicated appropriate timings, the selected adjustable parameter ($\alpha_a$ or $\alpha_b$) and inputs, at the each timing, the adjusted or new parameter ($\alpha_a$ or $\alpha_b$) to the controller 75.

However, the control-parameter adjusting portion 77 does not unconditionally adjust the selected adjustable parameter ($\alpha_a$ or $\alpha_b$). That is, under a first condition that the adjustment-permission register 63 stores the permission to adjust the adjustable parameter, the control-parameter adjusting portion 77 is permitted to adjust the selected adjustable parameter ($\alpha_a$ or $\alpha_b$). On the other hand, under a second condition that the adjustment-permission register 63 stores an inhibition from adjusting the adjustable parameter, the control-parameter adjusting portion 77 is inhibited from adjusting the selected adjustable parameter ($\alpha_a$ or $\alpha_b$). Therefore, under the second condition, the control-parameter adjusting portion 77 just selects, based on the rotation direction of the CR motor 10, stored by the rotation-direction register 57, one of the first adjustable parameter $\alpha_a$ and the second adjustable parameter $\alpha_b$, and inputs the selected adjustable parameter ($\alpha_a$ or $\alpha_b$) to the controller 75.

Whether the adjustment of the selected adjustable parameter ($\alpha_a$ or $\alpha_b$) is permitted or not is judged by judging whether a predetermined adjustment-permission condition has been met. More specifically described, for example, the operation panel 29 may be operated by a user of the MFD 1 to input the permission to adjust the selected adjustable parameter ($\alpha_a$ or $\alpha_b$), or the inhibition from adjusting the same. In this case, the CPU 51 sets the inputted permission or inhibition in the adjustment-permission register 63. Alternatively, the CPU 51 may be operated to set the permission in the register 63, each time a predetermined number of days have passed, each time a power of the MFD 1 is turned ON, or when an amount of change of an ambient temperature from a time when the power of the MFD 1 is turned ON has exceeded a threshold value. Thus, in the present embodiment, if the predetermined adjustment-permission condition has been met, then the control-parameter adjusting portion 77 is permitted to adjust the selected adjustable parameter ($\alpha_a$ or $\alpha_b$) but, if not, the adjusting portion 77 is inhibited from adjusting the parameter ($\alpha_a$ or $\alpha_b$).

Figure 4B:
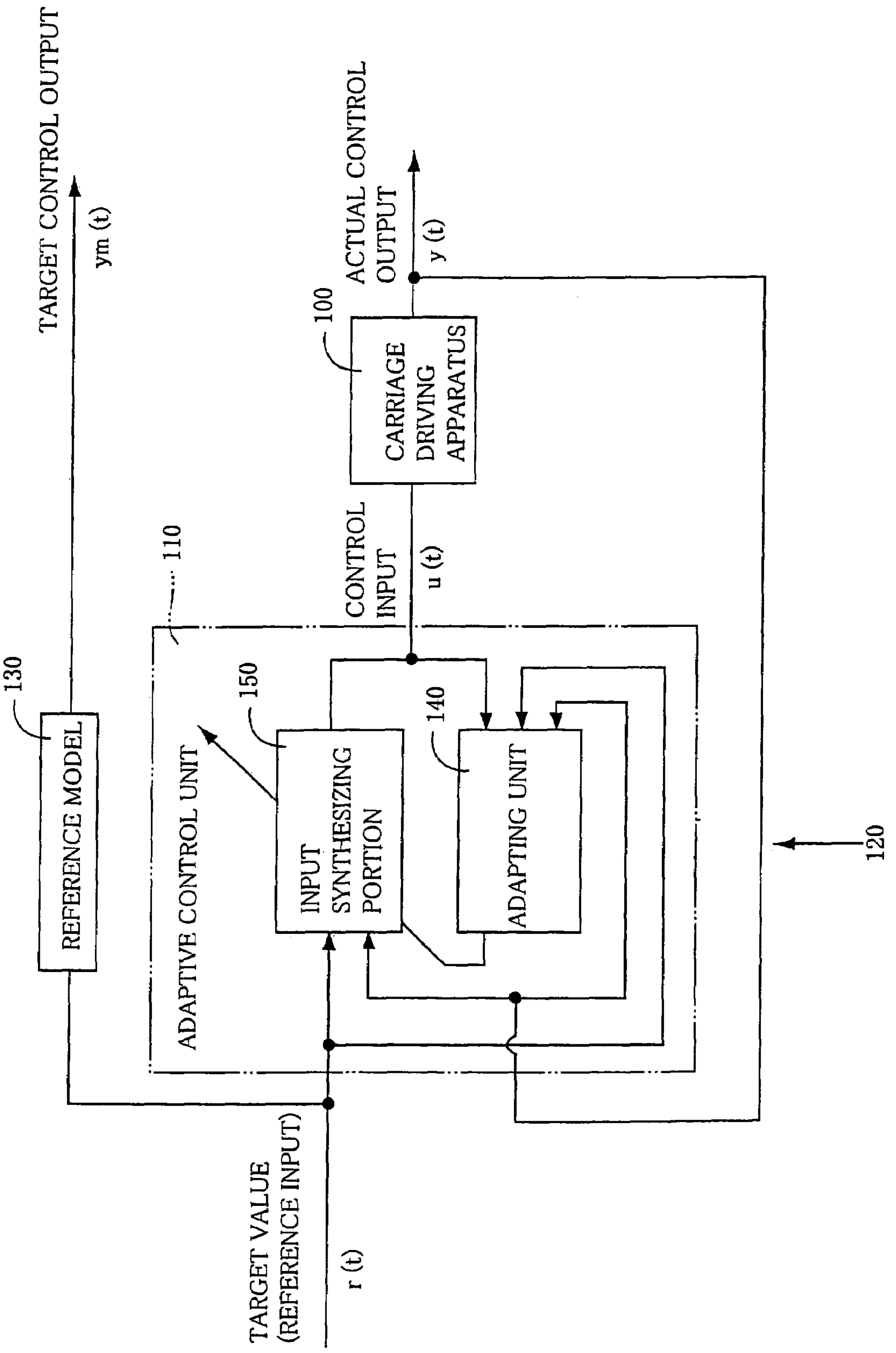
FIG. 4B is a schematic view for explaining a model reference adaptive control (MRAC) method employed by the carriage driving and controlling apparatus.

The control-parameter adjusting portion 77 cooperates with the controller 75 to adjust the selected adjustable parameter ($\alpha_a$ or $\alpha_b$), by the above-described model reference adaptive control (MRAC) method. As schematically shown in FIG. 4B, the MRAC method employs a closed loop 120 including a carriage driving apparatus 100 (e.g., the CR motor 10, the endless belt 42, and the two pulleys 43, 44) as an object to be controlled, and an adaptive control unit 110; and a reference model 130 whose output trajectory is to become equal to a target control output trajectory, $y_m(t)$, and the adaptive control unit 110 adjusts each of the first adjustable parameter $\alpha_a$ and the second adjustable parameter $\alpha_b$, such that an actual control output trajectory, y(t), of the carriage driving apparatus 100 becomes substantially equal to the target control output trajectory $y_m(t)$. In the present embodiment, the actual control output trajectory y(t) is obtained as respective operation (movement) speeds of the carriage 17 at respective times, i.e., respective operation (rotation) speeds of the CR motor 10 at respective times. In the following description, both the respective actual control outputs at the respective times and the actual control output trajectory as the set of actual control outputs at the respective times are represented by the same symbol, y(t).

The adaptive control unit 110 includes an adapting unit 140 and an input synthesizing portion 150. The elements 130, 140, 150 of FIG. 4B correspond to the control portion 71 of FIG. 4A; the element 140 corresponds to the control-parameter adjusting portion 77; and the elements 130, 150 correspond to the controller 75. The input synthesizing portion 150 determines, using a current value of the adjustable parameter ($\alpha_a$ or $\alpha_b$) at each time, a control input u(t) (in the present embodiment, a PWM duty ratio defining an electric current supplied to the CR motor 10), such that a deviation of an actual control output y(t) of the carriage driving apparatus 100 from a target value, r(t), as a reference input, is decreased. The thus determined control input u(t) is supplied to the drive-signal producing portion 72. This control input u(t) is also supplied, together with the target value r(t) and the actual control output y(t), to the adapting unit 140, so that the adapting unit 140 calculates, using the current value of the adjustable parameter ($\alpha_a$ or $\alpha_b$) at the each time (i.e., each adjusting timing), a control output corresponding to the supplied control input u(t), and adjusts the adjustable parameter ($\alpha_a$ or $\alpha_b$) such that an error of the thus calculated control output and the supplied actual control output y(t) is decreased. Then, the adapting unit 140 updates, in the input synthesizing portion 150, the current value of the adjustable parameter ($\alpha_a$ or $\alpha_b$)

to the adjusted value thereof, so that at the next time, the input synthesizing portion 150 may determine another control input u(t), by using the thus updated value of the adjustable parameter ($\alpha_a$ or $\alpha_b$). These steps are repeated so that the adjustable parameter ($\alpha_a$ or $\alpha_b$) is adjusted such that the actual control output trajectory of the controlled object (in the present embodiment, an actual velocity trajectory of the carriage 17 driven by the carriage driving apparatus 100) becomes substantially equal to the target control output trajectory (in the present embodiment, a target velocity trajectory of the carriage 17). This method will be described in more detail later.

The controller 75 produces or calculates the operating amounts u to be inputted to the CR motor 10, so that the carriage 17 is driven or moved while following the target velocity stored by the target-velocity register 62 and the target velocity trajectory produced based on the parameters stored by the target-velocity-trajectory-production-parameter register 61.

As described above, each time the control-parameter adjusting portion 77 adjusts the selected adjustable parameter ($\alpha_a$ or $\alpha_b$) to the adjusted new parameter, the new parameter is inputted to the controller 75. Thus, the controller 75 produces respective motor operating amounts u as control inputs by not continuing to use an initial adjustable parameter initially inputted thereto by the adjusting portion 77 but using respective new parameters each adjusted by the adjusting portion 77.

However, in the case where the adjustment-permission register 63 stores the inhibition from adjusting the selected adjustable parameter ($\alpha_a$ or $\alpha_b$), the control-parameter adjusting portion 77 does not adjust the adjustable parameter. In this case, therefore, the controller 75 calculates respective motor operating amounts u by continuing to use the initial adjustable parameter initially inputted by the adjusting portion 77.

The controller 75 continues to calculate motor operating amounts u from a time when the CPU 51 sets, in the start-command register 56, a start command to start the operation of the CR motor 10, to a time when it is judged that the carriage 17 has been stopped at the target stop position stored by the target-stop-position register 59.

The first and second adjustable parameters $\alpha_a$, $\alpha_b$ respectively stored by the first and second adjustable-parameter registers 64, 65 are initially read by the CPU 51 from the EEPROM 54 as a non-volatile memory, and are respectively set or written in the two registers 64, 65 by the same 51. That is, the first and second adjustable parameters $\alpha_a$, $\alpha_b$ are always held by the EEPROM 54.

Meanwhile, when a command to record images on one cut sheet P (i.e., a one-job image recording command) is produced by the MFD 1 itself, or is inputted thereto by an external computer system, not shown, the movement of the carriage 17, i.e., the operation of the CR motor 10 is started and, while the carriage 17 is moved, the selected adjustable parameter ($\alpha_a$ or $\alpha_b$) is iteratively adjusted at each of the appropriate timings as described above.

In the present embodiment, each time the carriage 17 is moved over the recording area (FIG. 1) in either one of the direction A and the direction B, a corresponding one of the two adjustable parameters $\alpha_a$, $\alpha_b$ that has been adjusted for the last time is returned to, i.e., rewritten in, a corresponding one of the two adjustable-parameter registers 64, 65. More specifically described, when the carriage 17 is moved in the direction A and then is stopped, the last adjusted first adjustable parameters $\alpha_a$ is stored in the first adjustable-parameter register 64; and subsequently, when the carriage 17 is moved in the direction B and then is stopped, the last adjusted second adjustable parameters $\alpha_b$ is stored in the second adjustable-parameter register 65. These actions are done each time the carriage 17 is reciprocated and, when the one-job image recording operation is finished, i.e., at an updating timing, the two adjustable parameters $\alpha_a$, $\alpha_b$ last stored in the two adjustable-parameter registers 64, 65 are returned to, and rewritten in, the EEPROM 54. Thus, the two adjustable parameters $\alpha_a$, $\alpha_b$ stored in the EEPROM 54 are updated.

Figure 6:
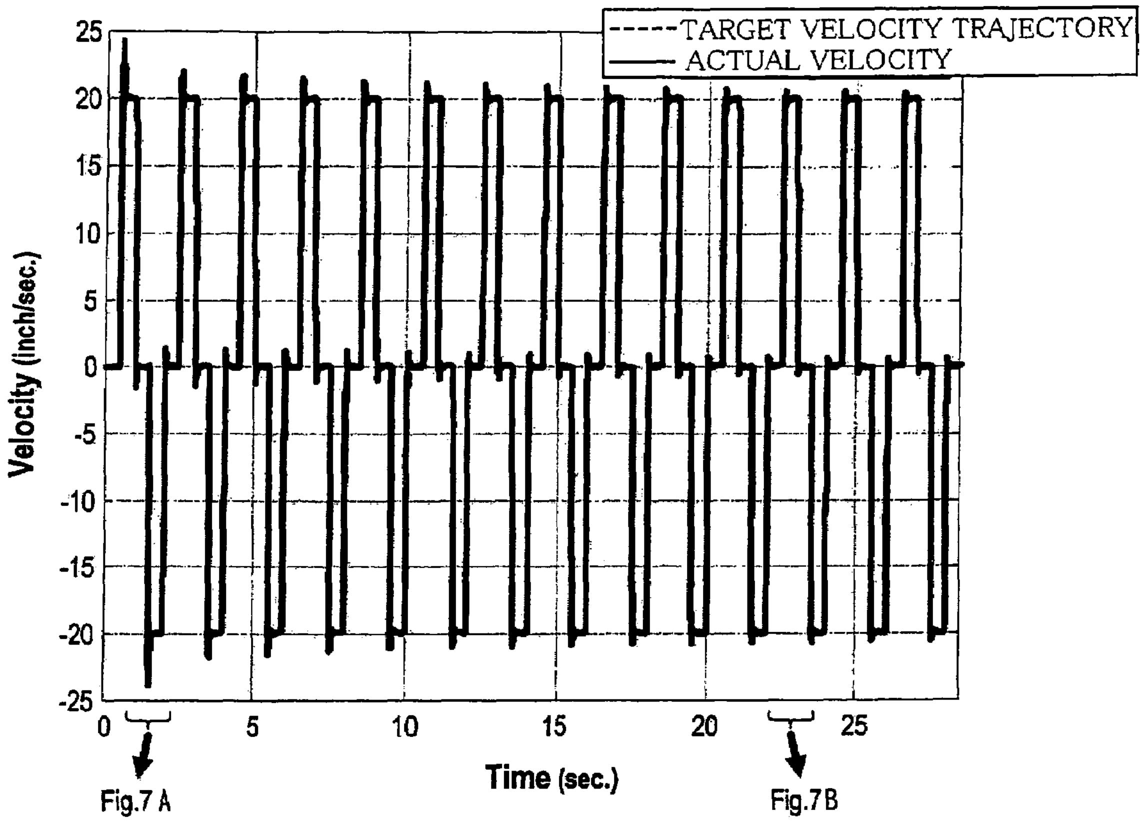
FIG. 6 is a graph representing a target velocity trajectory, and a time-wise change of an actual velocity of the carriage when the carriage is iteratively reciprocated.
Figure 7A:
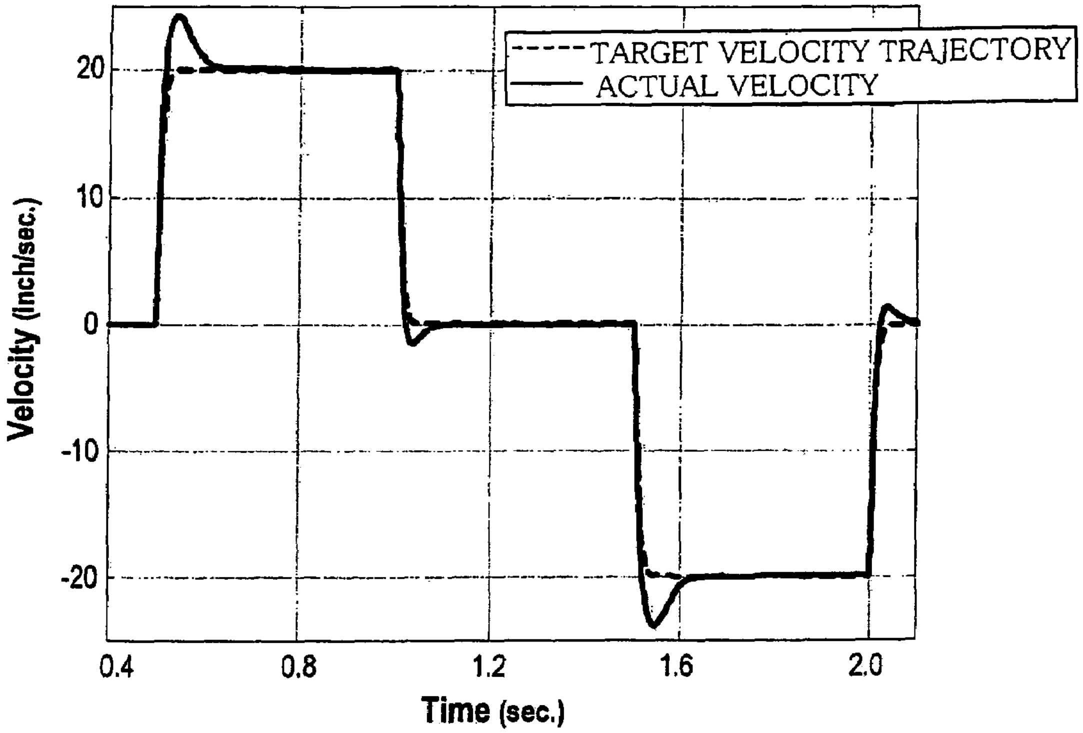
FIG. 7A is an enlarged view of a first portion of the graph of FIG. 6 that corresponds to a time period from 0.4 second to about 2.0 seconds.
Figure 7B:
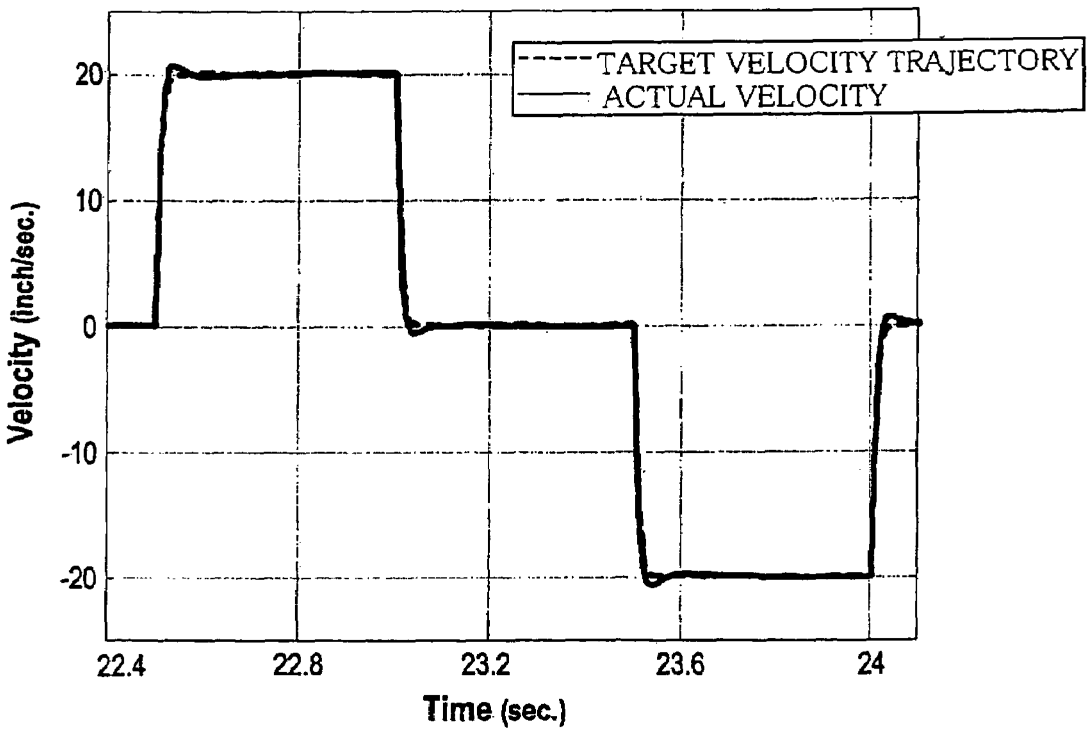
FIG. 7B is an enlarged view of a second portion of the graph of FIG. 6 that corresponds to a time period from 22.4 seconds to about 24 seconds.

When the carriage-driving controlling apparatus (FIG. 4) constructed as described above controls the CR motor 10 of the image recording portion 13, and thereby controls the movement of the carriage 17, the carriage 17 is moved at the actual (detected) velocity, enc_velocity, while following the target velocity trajectory, as shown in FIGS. 6, 7A, and 7B.

FIG. 6 shows a graph representing a time-wise change of the actual velocity of the carriage 17 when the carriage 17 is iteratively reciprocated, and the corresponding target velocity trajectory. FIG. 7A is an enlarged view of a first portion of the graph of FIG. 6 that corresponds to a time period from 0.4 second to about 2.0 seconds; and FIG. 7B is an enlarged view of a second portion of the graph of FIG. 6 that corresponds to a time period from 22.4 seconds to about 24 seconds.

Figure 17:
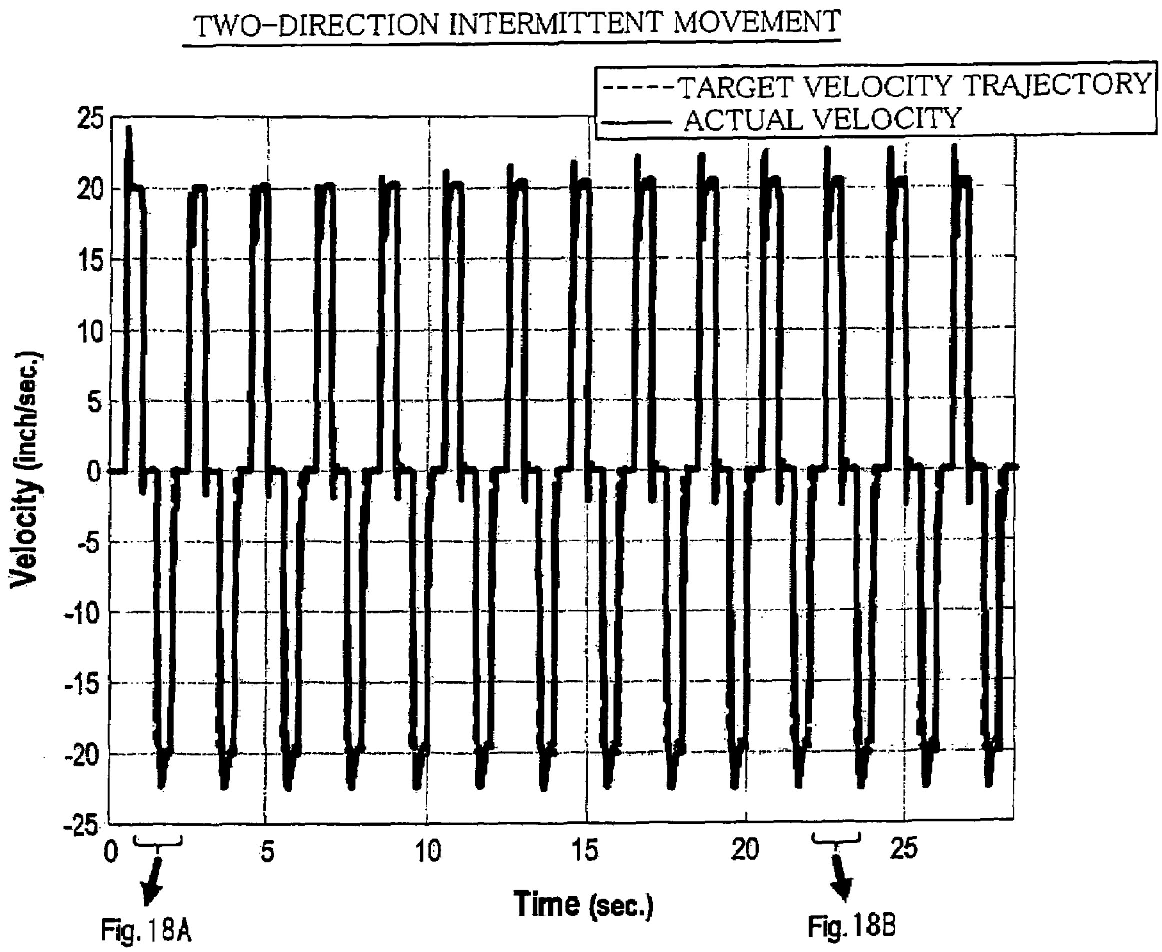
FIG. 17 is a graph representing a target velocity trajectory, and a time-wise change of an actual velocity of an object when the object is moved in opposite directions, iteratively at regular intervals of time.
Figure 18A:
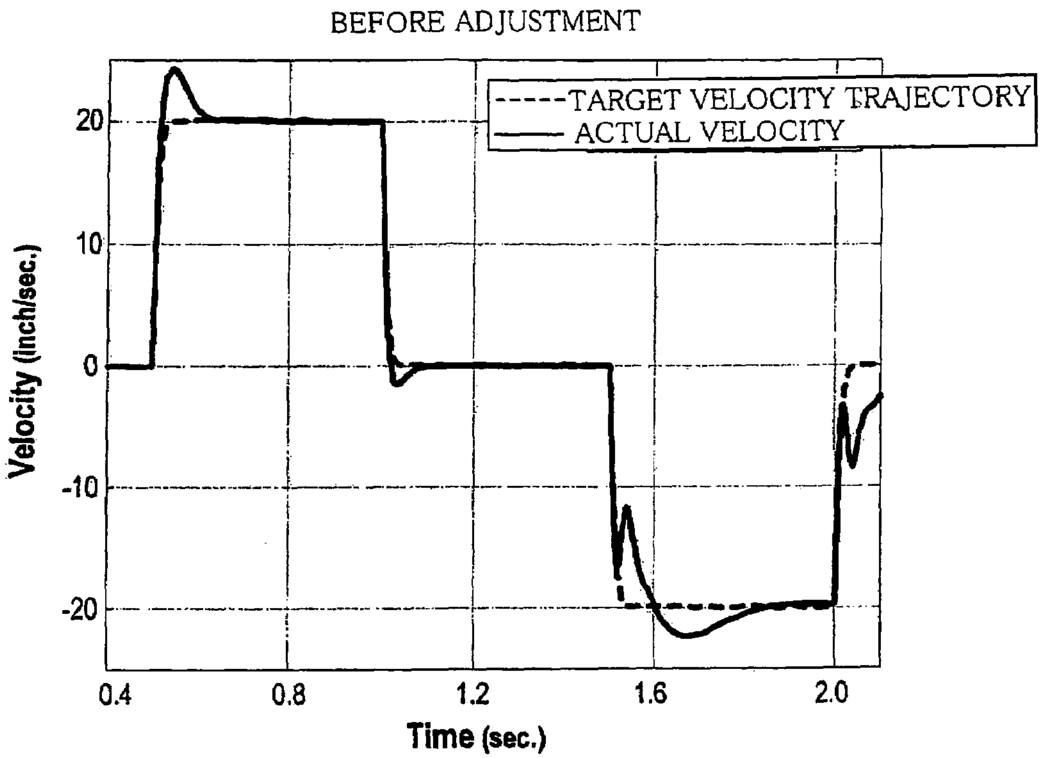
FIG. 18A is an enlarged view of a first portion of the graph of FIG. 17 that corresponds to a time period from 0.4 second to about 2.0 seconds.
Figure 18B:
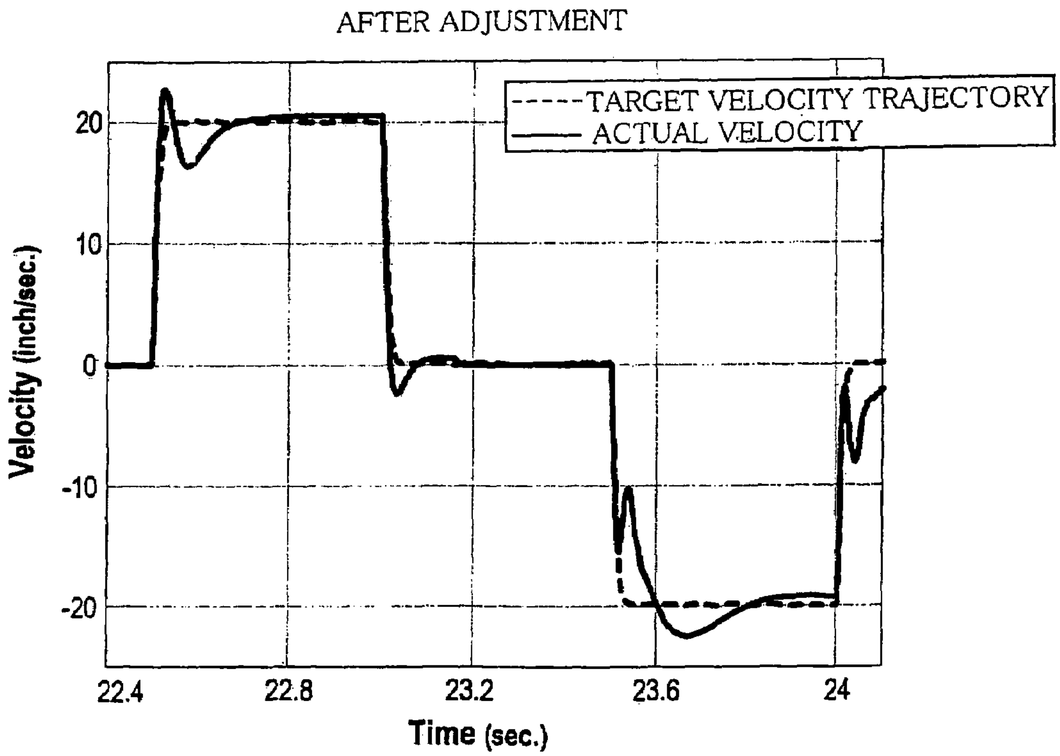
FIG. 18B is an enlarged view of a second portion of the graph of FIG. 17 that corresponds to a time period from 22.4 seconds to about 24 seconds.

As is apparent from the comparison of FIG. 6 corresponding to the invention and FIG. 17 corresponding to the related art, more specifically described, the comparison of FIG. 7B corresponding to the invention and FIG. 18B corresponding to the related art, the actual velocity of the carriage 17 gradually approaches the target velocity trajectory and finally substantially agrees with the same, according to the invention.

The reason why the above-indicated result is obtained is that the different adjustable parameters $\alpha_a$, $\alpha_b$ are employed corresponding to the different directions A, B in which the carriage 17 is driven or moved. That is, when the carriage 17 is moved in the direction A, the corresponding first adjustable parameter $\alpha_a$ is used to calculate the operating amounts u each to operate the CR motor 10; and when the carriage 17 is moved in the direction B, the corresponding second adjustable parameter $\alpha_b$ is used to calculate the motor operating amounts u.

More specifically described, when the carriage 17 is driven or moved in the direction A, the first adjustable parameter $\alpha_a$ is adjusted under the corresponding operating condition of the image recording portion 13 or the corresponding dynamic characteristic of the same 13, and is converged to an appropriate value; and when the carriage 17 is driven or moved in the direction B, the second adjustable parameter $\alpha_b$ is adjusted under the corresponding operating condition of the image recording portion 13 or the corresponding dynamic characteristic of the same 13, and is converged to an appropriate value. Thus, the two adjustable parameters $\alpha_a$, $\alpha_b$ are converged to respective appropriate values corresponding to the different directions A, B of movement of the carriage 17. Therefore, irrespective of in which one of the two directions A, B the carriage 17 may be moved, the actual velocity of the carriage 17 gradually approaches, and eventually substantially agrees with, the target velocity trajectory, as shown in FIGS. 6, 7A, and 7B.

Next, there will be described in more detail the manner in which each of the two adjustable parameters $\alpha_a$, $\alpha_b$ is adjusted by the control-parameter adjusting portion 77.

Assuming that an object to be controlled, i.e., the image recording portion 13 as the operating apparatus is a second order system including the CR motor 10 and its load (i.e., the carriage 17 and other elements), a relationship between control input (i.e., motor operating amount u(t)), and control output (i.e., detected carriage velocity y(t)), of this system can be expressed, using a transfer function P(s) of Equation (1), by Equation (2):

$$P(s) = \frac{b_1}{s^2 + a_1 \cdot s + a_2} = \frac{Np(s)}{Dp(s)} \tag{1}$$

$$y(t) = P(s)u(t) = \frac{Np(s)}{Dp(s)}u(t) \tag{2}$$

In addition, it is assumed that a target-velocity-trajectory production model is, like the controlled object, a second order system that is twice differentiable. Therefore, a relationship between input, r(t), and output, $y_m(t)$, of this model can be expressed, using a transfer function $P_m(s)$ of Equation (3), by Equation (4) where r(t) is a target convergent velocity:

$$P_m(s) = \frac{b_m}{s^2 + a_m \cdot s + b_m} \tag{3}$$

$$y_m(t) = P_m(s)r(t) \tag{4}$$

When an inverse model of the controlled object is used in obtaining a motor operating amount u(t), the motor operating amount u(t) needs to be obtained from a control output y(t). However, an inverse number of the transfer function P(s) cannot be used as it is. Therefore, an equation including a design constant, λ, is introduced and modified. More specifically described, in the following Equation (5), Q(s) and R(s) are uniquely determined.

$$(s+\lambda)^3 = Dp(s) \cdot Q(s) + R(s) \tag{5}$$

Hence, either side of Equation (5) is multiplied by Y(s), and additionally the relationship of Equation (2) is applied thereto. Thus, Equation (5) is modified to Equation (6):

$$\begin{aligned}(s+\lambda)^3 Y(s) &= Dp(s) \cdot Q(s) \cdot Y(s) + R(s) \cdot Y(s) \\ &= Np(s) \cdot Q(s) \cdot U(s) + R(s) \cdot Y(s)\end{aligned} \tag{6}$$

In Equation (6), s is well-known Laplacean (i.e., a differential operator). Therefore, using a parameter α, Equation (6) can be changed to Equation (7):

$$(s+\lambda)^2 y(t) = \frac{1}{s+\lambda} Np(s) \cdot Q(s) \cdot u(t) + \frac{1}{s+\lambda} R(s) \cdot y(t) \equiv \alpha^T \xi(t) \tag{7}$$

where $$\alpha = [\,\alpha_1 \quad \alpha_2 \quad \alpha_3 \quad \alpha_4\,]^T \cdot \xi(t) = [\,\xi_1 \quad \xi_2 \quad \xi_3 \quad \xi_4\,]^T$$

and $$\xi_1(t) = u(t)$$

$$\xi_2(t) = \frac{1}{s+\lambda} u(t)$$

$$\xi_3(t) = y(t)$$

$$\xi_4(t) = \frac{1}{s+\lambda} y(t)$$

In Equation (7), T is a well-known symbol indicating transposition. To cause the actual output y(t) to approach the model output $y_m(t)$, the parameter a is adjusted on-line. As described above, in the present embodiment, the two parameters α ($\alpha_a$, $\alpha_b$) corresponding to the two directions A, B in which the carriage 17 is driven or moved are employed, that is, the first parameter $\alpha_a$ ($\alpha_{a1}$, $\alpha_{a2}$, $\alpha_{a3}$, $\alpha_{a4}$) corresponding to the direction A and the second parameter $\alpha_b$ ($\alpha_{b1}$, $\alpha_{b2}$, $\alpha_{b3}$, $\alpha_{b4}$) corresponding to the direction B.

If the parameter α is known, the motor operating amount t(u) to cause the actual output y(t) to approach the model output $y_m(t)$, that is, to cause the controlled object to operate at the model output $y_m(t)$ as the target velocity trajectory, is so determined as to satisfy Equation (8) obtained by replacing, in Equation (7), the actual output y(t) with the model output $y_m(t)$:

$$(s+\lambda)^2 y_m(t) = \alpha^T \xi(t) \tag{8}$$

Since the component $\xi_1(t)$ is equal to the motor operating amount u(t) (i.e., $\xi_1(t)=u(t)$), the motor operating amount u(t) can be expressed by Equation (9):

$$u(t) = \frac{(s+\lambda)^2 y_m(t) - \alpha_2 \xi_2(t) - \alpha_3 \xi_3(t) - \alpha_4 \xi_4(t)}{\alpha_1} \tag{9}$$

In fact, however, the parameter α is a variable parameter of the controlled object. Therefore, Equation (10) is obtained by replacing, in Equation (9), the parameter α with a variable parameter, α-hat(t):

$$u(t) = \frac{(s+\lambda)^2 y_m(t) - \hat{\alpha}_2(t)\xi_2(t) - \hat{\alpha}_3(t)\xi_3(t) - \hat{\alpha}_4(t)\xi_4(t)}{\hat{\alpha}_1(t)} \tag{10}$$

The variable parameter α-hat(t) (i.e., an estimated value of the parameter α) corresponds to the adjustable parameter α (i.e., the first parameter $\alpha_a$ and the second parameter $\alpha_b$) that is adjusted while the carriage 17 is moved. If the variable parameter α-hat(t) is converged to an actual parameter α and the motor operation amount u(t) obtained according to Equation (10) is applied to the controlled object, then the object can accurately follow the target velocity trajectory.

Next, there will be explained an adjusting method in which the variable parameter α-hat(t) (i.e., the adjustable parameter α) is adjusted, i.e., a concrete method in which the estimated value of the parameter α is converged to the actual value α.

The method in which the estimated value of the parameter α is caused to approach the true value α can be selected from various options, d epending upon what kind of error equation and performance function are used. One of those options is that the error equation is expressed by an algebraic equation, the performance function is so determined as to reduce an error of the actual output y(t) and an output y-hat(t) of an estimation model that is estimated based on the variable parameter α-hat(t), and the variable parameter α-hat(t) is so adjusted as to reduce a performance value. This option is employed in the present embodiment.

The actual control output y(t) can be expressed by Equation (11) that is obtained by re-defining Equation (7) with respect to the same y(t):

$$y(t) = \alpha^T \zeta(t) \tag{11}$$

where $$\zeta(t) = \frac{1}{(s+\lambda)^2} \xi(t)$$

Thus, the control output y-hat(t) of the estimation model having the unknown parameter α-hat(t) can be expressed by Equation (12):

$$\hat{y}(t)=\hat{\alpha}^T(t)\xi(t) \tag{12}$$

If the estimated control output y-hat(t) coincides with the actual control output y(t) of the controlled object, then it can be said that the variable parameter α-hat(t) coincides with the true value α, i.e., that dynamics of the controlled object coincides with the dynamics of the estimation model. In this state, if the motor operation amount u(t) obtained according to Equation (10) is applied to the controlled object, then the actual control output y(t) of the controlled object can accurately follow the target controlled-amount trajectory.

Assuming that an error signal, ϵ(t), represents a difference of the actual output y(t) and the estimated output y-hat(t), the error signal ϵ(t) can be expressed by Equation (13):

$$\begin{aligned}\varepsilon(t) &= y(t) - \hat{y}(t)\\ &= \alpha^T\zeta(t) - \hat{\alpha}^T(t)\zeta(t)\end{aligned} \tag{13}$$

However, here, it is not assured that the signal ζ(t) is bounded. Hence, using an appropriate normalizing signal, the error signal ϵ(t) is normalized. More specifically described, using a normalizing signal, N(t), defined by Equation (14), the error signal ϵ(t) defined by Equation (13) is normalized, and a normalized error signal, $\epsilon_N(t)$, defined by Equation (15), is obtained.

$$N(t) = \sqrt{\rho + \zeta^T(t)\zeta(t)} \tag{14}$$

$$\begin{aligned}\varepsilon_N(t) &= \frac{\varepsilon(t)}{N(t)}\\ &= \alpha^T\zeta_N(t) - \hat{\alpha}^T(t)\zeta_N(t)\end{aligned} \tag{15}$$

In Equation (14), ρ is determined at an arbitrary small value assuring that N(t) is not equal to zero.

The variable parameter α-hat(t) is so adjusted as to reduce the normalized error signal $\epsilon_N(t)$, i.e., the difference of the actual output y(t) and the estimated output y-hat(t). This adjustment is carried out by the control-parameter adjusting portion 77.

In order to obtain the parameter adjusting method, for example, a performance function defined by Equation (16) is given to the normalized error signal $\epsilon_N(t)$:

$$J(\hat{\alpha}(t)) = \frac{1}{2}(\varepsilon_N(t))^2 \tag{16}$$

This performance function is convex with respect to the variable parameter α-hat(t), and accordingly takes a minimum value at a certain value of the parameter α-hat(t). In the present embodiment, the certain value of the variable parameter α-hat(t) that minimizes the performance function is sought by a well-known gradient method. An algorithm of the gradient method is expressed by Equation (17):

$$\dot{\hat{\alpha}}(t) = -\Gamma\frac{\partial J(\hat{\alpha})}{\partial\hat{\alpha}} \tag{17}$$

where $\Gamma = \Gamma^T > 0$

In Equation (17), the vector Γ is a design constant that is pre-determined at an appropriate value based on, e.g., experiments. A partial differential term of the right side of Equation (17) is expressed by Equation (18):

$$\begin{aligned}\frac{\partial J(\hat{\alpha})}{\partial\hat{\alpha}} &= \frac{\partial}{\partial\hat{\alpha}}\left(\frac{1}{2}(\varepsilon_N(t))^2\right)\\ &= \frac{\partial}{\partial\hat{\alpha}}\left(\frac{1}{2}(\alpha^T\zeta_N(t) - \hat{\alpha}^T(t)\zeta_N(t))^2\right)\\ &= (-\alpha^T\zeta_N(t) + \hat{\alpha}^T(t)\zeta_N(t))\cdot\zeta_N(t)\\ &= -\varepsilon_N(t)\zeta_N(t)\end{aligned} \tag{18}$$

Therefore, the following Equation (19) is obtained:

$$\dot{\hat{\alpha}}(t)=\Gamma\zeta_N(t)\epsilon_N(t) \tag{19}$$

Then, a value obtained by integrating the left side of Equation (19) is inputted, as the variable parameter α-hat(t), to the controller 75. Thus, the variable parameter α-hat(t) is adjusted in a direction to reduce the error, i.e., the normalized error signal $\epsilon_N(t)$.

Meanwhile, the normalized error signal $\epsilon_N(t)$ defined by Equation (15) may be expressed by Equation (20):

$$\begin{aligned}\varepsilon_N(t) &= \frac{\varepsilon(t)}{N(t)}\\ &= \frac{1}{N(t)}(\alpha^T\zeta(t) - \hat{\alpha}^T(t)\zeta(t))\\ &= \frac{1}{N(t)}(y(t) - \hat{\alpha}^T(t)\zeta(t))\end{aligned} \tag{20}$$

As is apparent from Equation (20), the input parameters needed by the control-parameter adjusting portion 77 to adjust each of the first and second adjustable parameters $\alpha_a$, $\alpha_b$ are the motor operating amount u(t) produced and outputted by the controller 75 and the actual control output y(t) corresponding to the motor operating amount u(t), i.e., the actual (detected) velocity, enc_velocity, calculated by the velocity calculating portion 70 based on the encoder signals, encA, encB, provided by the linear encoder 48.

Thus, the image recording portion 13 including the CR motor 10 and the carriage 17 are controlled while the selected adjustable parameter ($\alpha_a$, $\alpha_b$) as the control parameter is adjusted based on the motor operating amount u(t) as the control input, and the detected carriage velocity y(t) as the control output (i.e., the controlled amount, or the driven amount) corresponding to the motor operating amount u(t). This control method is a well-known "model reference adaptive control (MRAC)" method as one of adaptive control methods. That is, in the present embodiment, the image recording portion 13 including the CR motor 10 and the carriage 17 are controlled by the model reference adaptive control method in which one of the two adjustable parameters $\alpha_a$, $\alpha_b$ that corresponds to the currently selected one of the two sorts of operating conditions or the two different dynamic characteristics (i.e., the two directions A, B in which the carriage 17 is driven or moved) is used to control the CR motor 10 and thereby drive the carriage 17, and is adjusted while the carriage 17 is driven or moved.

Next, there will be described a main control routine carried out by the CPU 51, by reference to a flow chart shown in FIG. 8. In the MFD 1, the CPU 51 carries out the main control routine including a sheet supplying routine, an image recording routine, and a sheet discharging routine. When the CPU 51 receives an image-recording command (e.g., a command to record images corresponding to one job) from a personal computer (PC) connected to the MFD 1, or the operation panel 29 of the MFD 1, the CPU 51 carries out the main control routine.

When the main control routine is started, first, at Step S100, the CPU 51 sets, in the ASIC 52, control data in the registers related to the sheet supplying routine. Thus, the ASIC 52 operates for performing the sheet supplying routine in which the cut sheet P is supplied to a predetermined registration position. This is the sheet supplying routine that is followed by the image recording routine, i.e., Steps S120 through S150.

When the image recording routine is started, first, at Step S120, the CPU 51 carries out an initial feeding routine in which the ASIC 52 operates for feeding the cut sheet P such that a start point of an image-recording portion of the cut sheet P is positioned at a predetermined image-recording position. Step S120 is followed by Step S130 where the CPU 51 carries out a one-line-image recording routine in which the carriage 17 is reciprocated in the main scan direction while the recording head 15 ejects droplets of ink to record one-line images on the sheet P.

Step S130 is followed by Step S140 where the CPU 51 judges whether images have been recorded up to an end point of the image-recording portion of the cut sheet P. If a negative judgment is made at Step S140, then the control of the CPU 51 goes to Step S150 where the CPU 51 operates for intermittently feeding the cut sheet P by an amount assuring that a portion of the sheet P where the next one line is to be recorded is positioned at the predetermined image-recording position. After Step S150, the control goes back to Step S130 to carry out another one-line-image recording operation.

Meanwhile, if a positive judgment is made at Step S140, then the control goes to Step S160 where the CPU 51 carries out the sheet discharging routine in which the ASIC 52 operates for discharging the cut sheet P through the sheet discharging portion 21.

Figure 8:
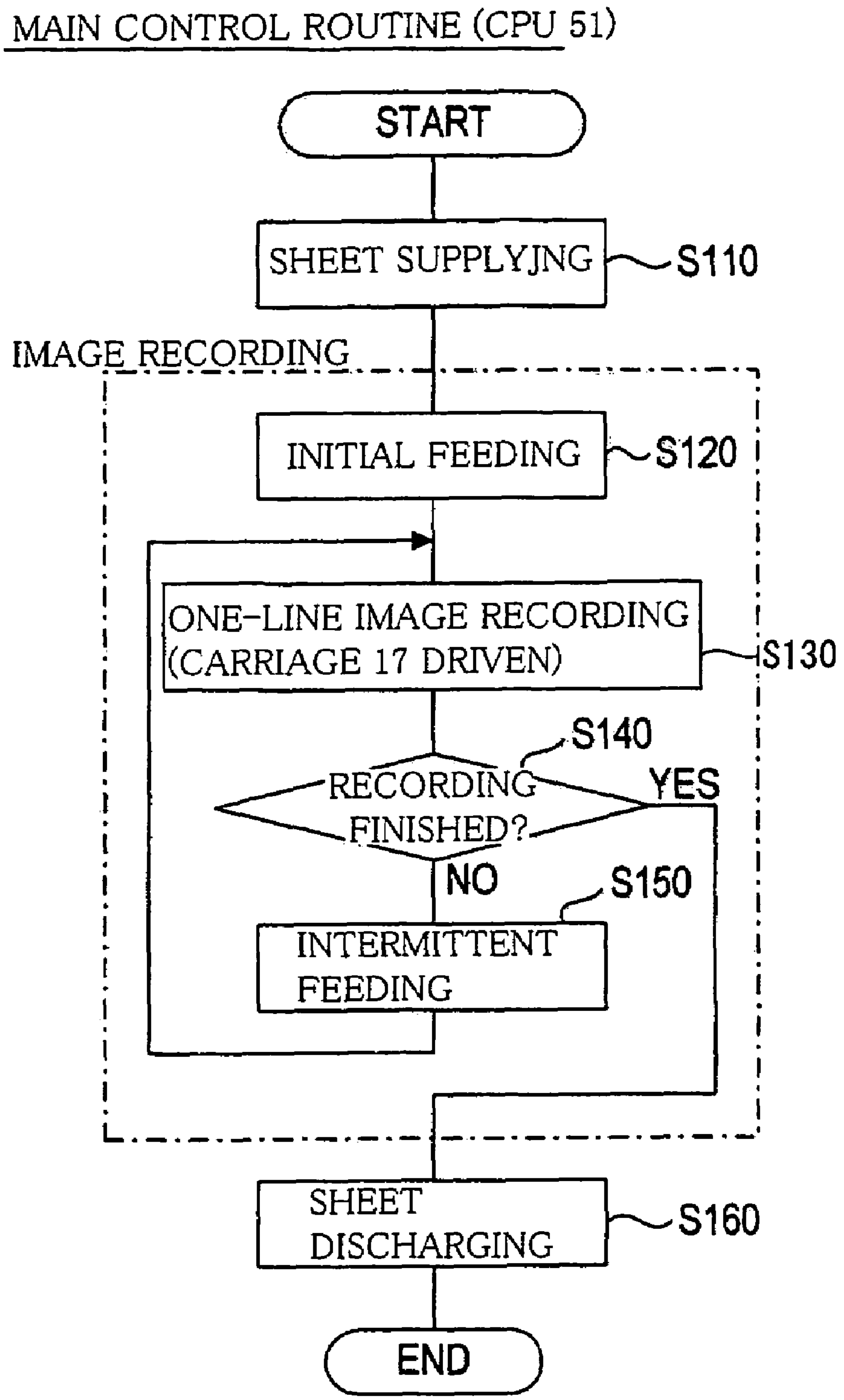
FIG. 8 is a flow chart representing a main control routine that is carried out by a CPU (central processing unit) of the MFD.
Figure 9:
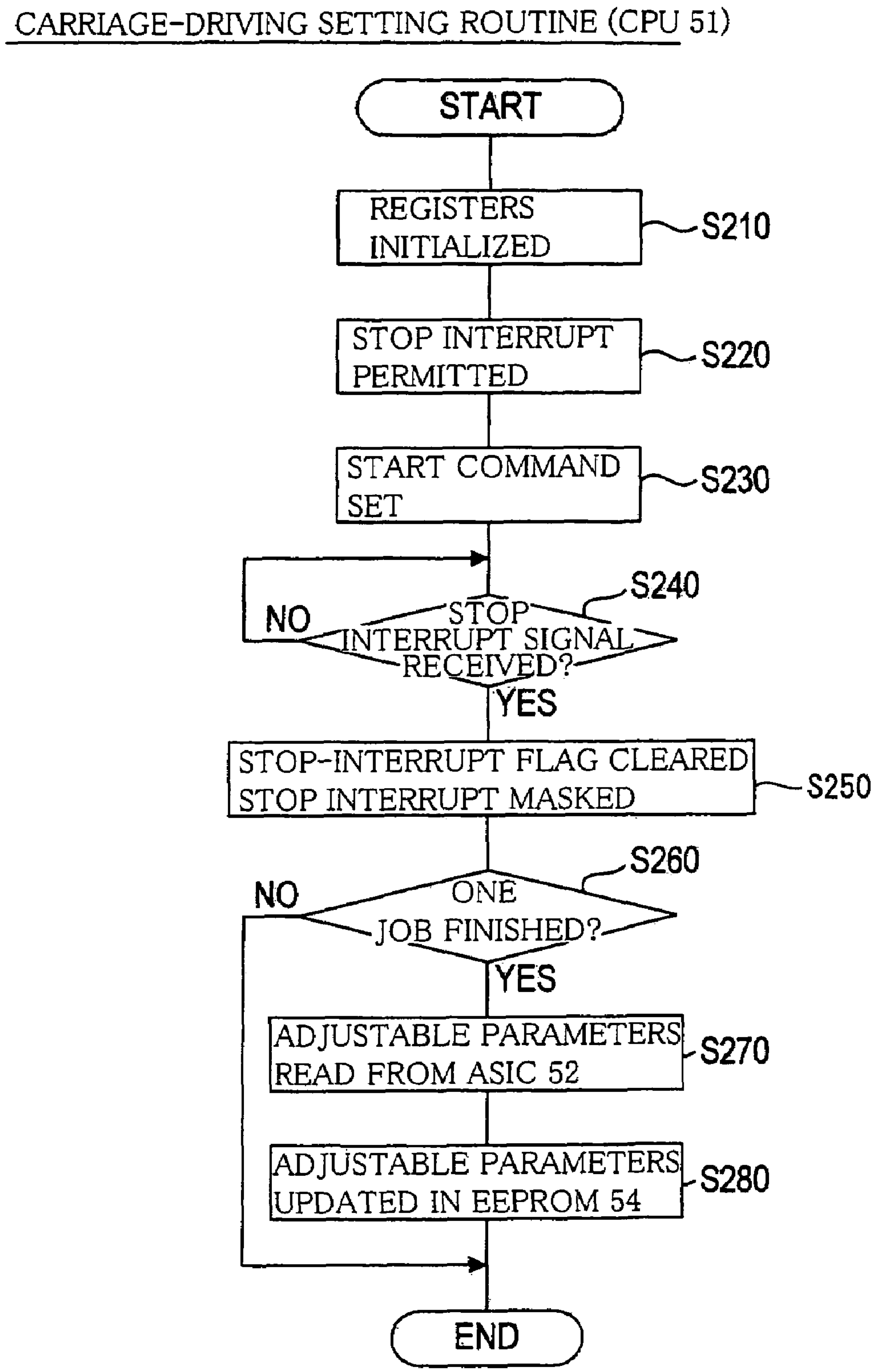
FIG. 9 is a flow chart representing a carriage-driving setting routine carried out by the CPU.

In the one-line-image recording routine carried out at Step S130 of the main control routine of FIG. 8, a carriage-driving setting routine to drive the carriage 17 is carried out by the CPU 51 according to a flow chart shown in FIG. 9.

When the carriage-driving setting routine is started, first, at Step S210, the CPU 51 initializes the individual registers of the operation-mode register group 55 of the ASIC 52. More specifically described, a selected rotation direction is set or stored in the rotation-direction register 57; the first adjustable parameter $\alpha_a$ and the second adjustable parameter $\alpha_b$ stored in the EEPROM 54 are set or stored in the first adjustable-parameter register 64 and the second adjustable-parameter register 65, respectively; and an adjustment permission or an adjustment inhibition is set or stored in the adjustment-permission register 63.

Step S210 is followed by Step S220 where the CPU 51 issues, to the ASIC 52, a permission to input a 'stop' interrupt signal to the CPU 51. Thus, the ASIC 52 is enabled to input a 'stop' interrupt signal to the CPU 51.

Thus, each time the carriage 17 is stopped at a target stop position set or stored in the target-stop-position register 59 and this situation is detected by the signal processing portion 79, the ASIC 52 inputs a 'stop' interrupt signal to the CPU 51. Also, in the intermittent feeding routine carried out at Step S150 of FIG. 8, each time the cut sheet P is stopped at its target stop position and this situation is detected by the signal processing portion 79, the ASIC 52 inputs a 'stop' interrupt signal to the CPU 51.

Step S220 is followed by Step S230 where the CPU 51 sets a start command in the start-command register 56 of the ASIC 52. Thus, in the ASIC 52, the controller 75 starts calculation of an operating amount u, so as to operate the CR motor 10 and thereby drive or reciprocate the carriage 17. The operation of the CR motor 10 or the reciprocation of the carriage 17 that is started after the start command is set in the start-command register 56, is basically controlled by the ASIC 52 (FIG. 10), while the CPU 51 waits, at Step S240, for receiving a 'stop' interrupt signal.

If the CPU 51 receives a 'stop' interrupt signal from the ASIC 52, a positive judgment is made at Step S240, and the control goes to Step S250 where the CPU 51 clears a stop-interrupt flag, and carries out a stop-interrupt masking routine so as not to receive any additional 'stop' interrupt signal. Step S250 is followed by Step S260 to judge whether all the images corresponding to one job have been recorded. If a positive judgment is made at Step S260, the control goes to Step S270 where the CPU 51 reads the last adjusted, first adjustable parameter $\alpha_a$ and the last adjusted, second adjustable parameter $\alpha_b$ from the first adjustable-parameter register 64 and the second adjustable-parameter register 65 of the ASIC 52, respectively, and then goes to Step 280 where the CPU 51 updates the first and second adjustable parameters $\alpha_a$, $\alpha_b$ currently stored in the EEPROM 54, to the last adjusted, first and second adjustable parameters $\alpha_a$, $\alpha_b$ read from the two registers 64, 65.

Figure 10:
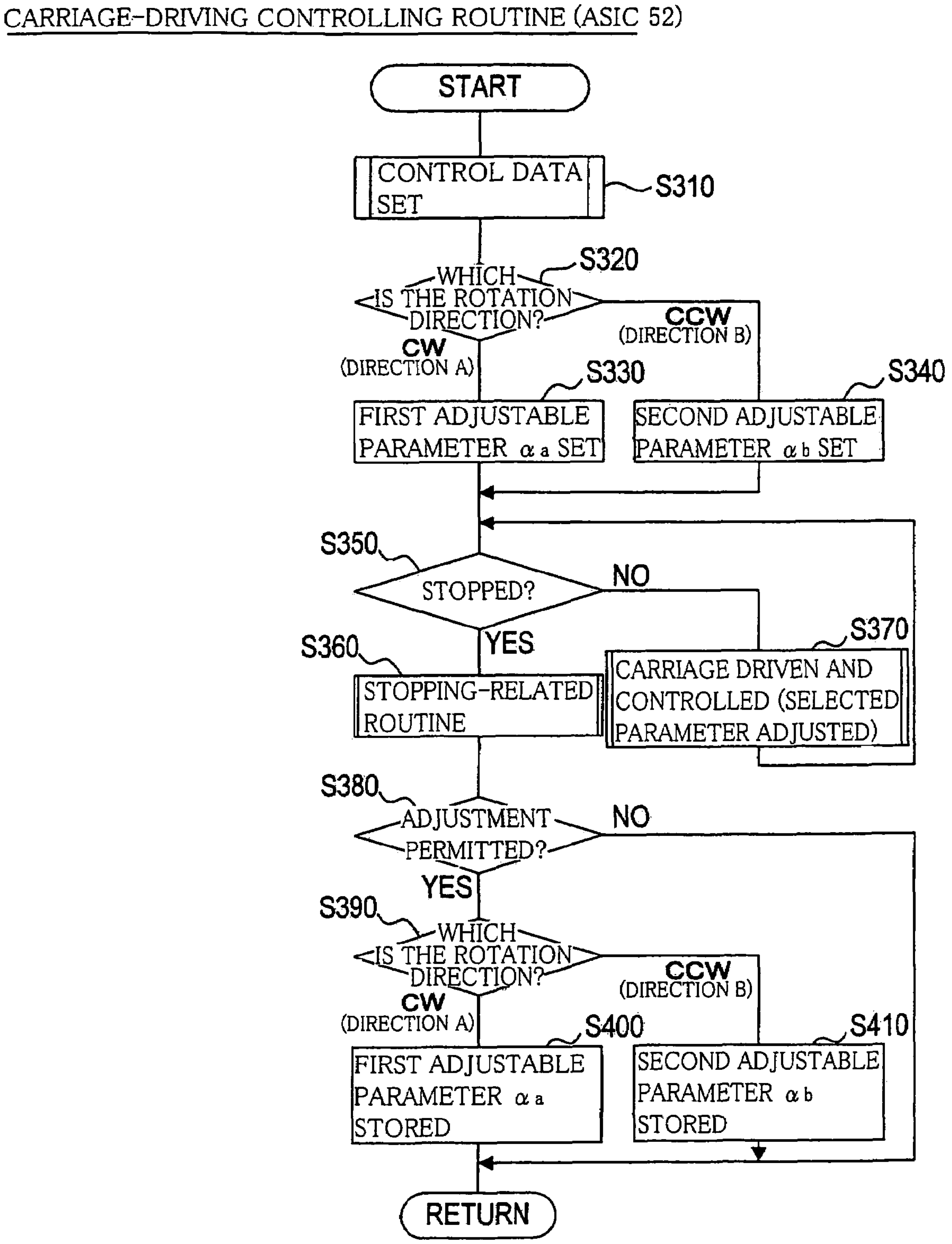
FIG. 10 is a flow chart representing a carriage-driving controlling routine carried out by an ASIC of the carriage driving and controlling apparatus.

FIG. 10 is a flow chart representing a carriage-driving controlling routine that is carried out by the ASIC 52 after the start command is set by the CPU 51 at Step S230 of FIG. 9. As described above, the carriage-driving controlling routine is carried out under the control of the ASIC 52 as hardware. However, here, the controlling operation of the ASIC 52 is described by reference to the flow chart, for easier understanding purposes only.

When the carriage-driving controlling routine is started, first, at Step S310, the ASIC 52 sets various data (e.g., various parameters) needed to operate the CR motor 10 and thereby drive the carriage 17. Then, at Step S320, based on the selected rotation direction stored in the rotation direction register 57, the direction in which the CR motor 10 is to be driven or rotated, is identified. In the case where the CR motor 10 is rotated in the forward direction, CW, to move the carriage 17 in the direction A, the control goes to Step S330 to select the first adjustable parameter $\alpha_a$; and in the case where the CR motor 10 is rotated in the backward direction, CCW, to move the carriage 17 in the direction B, the control goes to Step S340 to select the second adjustable parameter $\alpha_b$. Steps S320, S330, and S340 are carried out by the control-parameter adjusting portion 77.

Then, at Step S350, whether the movement of the carriage 17 in the selected direction A or B has been stopped, is judged. If a positive judgment is made at Step S350, the control goes to Step S360 to carry out an appropriate stopping routine. However, if a negative judgment is made at Step S350, the control goes to Step S370 to start a carriage driving and controlling routine. While the carriage driving and controlling routine is carried out, i.e., while the carriage 17 is driven by the CR motor 10, the one adjustable parameter ($\alpha_a$ or $\alpha_b$) selected by the control-parameter adjusting portion 77 is iteratively adjusted by the same 77 at each of appropriate timings, under the above-described condition that the adjustment permission is set in the adjustment-permission register 63. The concrete method in which the adjustable parameter ($\alpha_a$ or $\alpha_b$) is iteratively adjusted has been described above using the equations (1) through (20).

Step S360 is followed by Step S380 to judge whether the adjustment of the selected adjustable parameter ($\alpha_a$ or $\alpha_b$) is permitted, i.e., whether the adjustment permission is set in the adjustment-permission register 63. If a negative judgment is made at Step S380, the current control cycle of the carriage-driving controlling routine of FIG. 10 is ended, and then the carriage 17 is started to move in the opposite direction. On the other hand, if a positive judgment is made at Step S380, the control goes to Step S390 to identify the direction in which the CR motor 10 has been rotated before being stopped. In the case where the CR motor 10 has been rotated in the forward direction CW to move the carriage 17 in the direction A, the control goes to Step S400 to store the last adjusted (i.e., newest), first adjustable parameter $\alpha_a$ in the first adjustable-parameter register 64; and in the case where the motor 10 has been rotated in the backward direction CCW to move the carriage 17 in the direction B, the control goes to Step S410 to store the last adjusted (newest) second adjustable parameter $\alpha_b$ in the second adjustable-parameter register 64. Thus, the adjustable parameters $\alpha_a$, $\alpha_b$ are adjusted before the image recording operation as a proper operation of the image recording portion 13 is started.

In the MFD 1 constructed as described above, the two adjustable parameters $\alpha_a$, $\alpha_b$ respectively corresponding to the two movement directions of the carriage 17 (i.e., the two rotation directions of the CR motor 10) are employed, and each one of the two adjustable parameters $\alpha_a$, $\alpha_b$ is used when the carriage 17 is moved in a corresponding one of the two movement directions. While the carriage 17 is moved in the one direction, the each one adjustable parameter is iteratively adjusted at each of appropriate timings. Therefore, while the carriage 17 is moved in each one of the two directions A, B, a corresponding one of the two adjustable parameters $\alpha_a$, $\alpha_b$ is iteratively adjusted and eventually converged with reliability. Thus, the carriage 17 can be reciprocated in an appropriate manner, and excellent images can be recorded on the cut sheet P.

In addition, the two adjustable parameters $\alpha_a$, $\alpha_b$ stored in the EEPROM 54 are updated, at an appropriate timing (e.g., each time a one-job image recording operation is finished) to the respective last adjusted (newest) values at that timing. Therefore, each time a current one-job image recording operation is started, the two adjustable parameters $\alpha_a$, $\alpha_b$ updated when the last one-job image recording operation is finished are used as the respective initial values of the two adjustable parameters for the current recording operation, so that the controller 75 starts calculating the operating amounts u. Thus, immediately (or quickly) after the movement of the carriage 17 is started, the carriage 17 can be moved at velocities accurately following the target velocity trajectory.

The selected adjustable parameter ($\alpha_a$, $\alpha_b$) is not unconditionally adjusted, but it is adjusted only when the predetermined adjustment-permitting condition is met. Thus, the adjustment of the selected adjustable parameter ($\alpha_a$, $\alpha_b$) can be done only when the adjustment is needed, and accordingly useless parameter adjusting operations can be prevented. For example, in the case where fine dust enters the driving-force transmitting device of the carriage 17 and thereby changes the dynamic characteristic of the same 17, the selected adjustable parameter ($\alpha_a$, $\alpha_b$) can be prevented from being adjusted toward the changed dynamic characteristic of the same 17, i.e., in a user's undesired direction, and therefore the movement of the carriage 17 can be prevented from being adversely influenced by the adjustment.

Moreover, in the present embodiment, each of the first and second adjustable parameters $\alpha_a$, $\alpha_b$ is adjusted under the model reference adaptive control (MRAC). The MRAC assures that the controller 75 is so designed that each adjustable parameters $\alpha_a$, $\alpha_b$ can be adjusted with high stability. Thus, the MRAC is preferably used in adjusting each adjustable parameter $\alpha_a$, $\alpha_b$. However, the MRAC may be replaced with a well-known self-tuning control, as will be described later.

In the present embodiment, the CPU 51 corresponds to each of an updating portion, an adjustment permitting and inhibiting portion, and an adjusting-portion control portion; the controller 75 corresponds to a control-input calculating portion; the control-parameter adjusting portion 77 corresponds to each of a parameter adjusting portion and a parameter-group selecting portion; the EEPROM 54 corresponds to an adjustable-parameter memory; and the linear encoder 48 corresponds to a control-output obtaining portion. In addition, the driving-signal producing portion 72 and the driver circuit 53 cooperate with each other to constitute a motor driving portion.

In the carriage-driving setting routine of FIG. 9, carried out by the CPU 51, Step S210 corresponds to an adjustment permitting and inhibiting step; and Steps S260, S270, and S280 correspond to an updating step. In addition, in the carriage-driving controlling routine of FIG. 10, carried out by the ASIC 52, Steps S320, S330, and S340 corresponds to an parameter-group selecting step.

Second Embodiment

In the above-described first embodiment, the motor controlling method and apparatus in accordance with the present invention are applied to the CR motor 10 that drives or moves the carriage 17. However, those can also be applied to an electric motor that feeds a cut sheet P as a recording medium, in the MFD 1 shown in FIG. 1. In the second embodiment, the MFD 1 employs, as control parameters, a plurality of adjustable parameters β respectively corresponding to a plurality of sorts of cut sheets P as a plurality of recording media.

Figure 11:
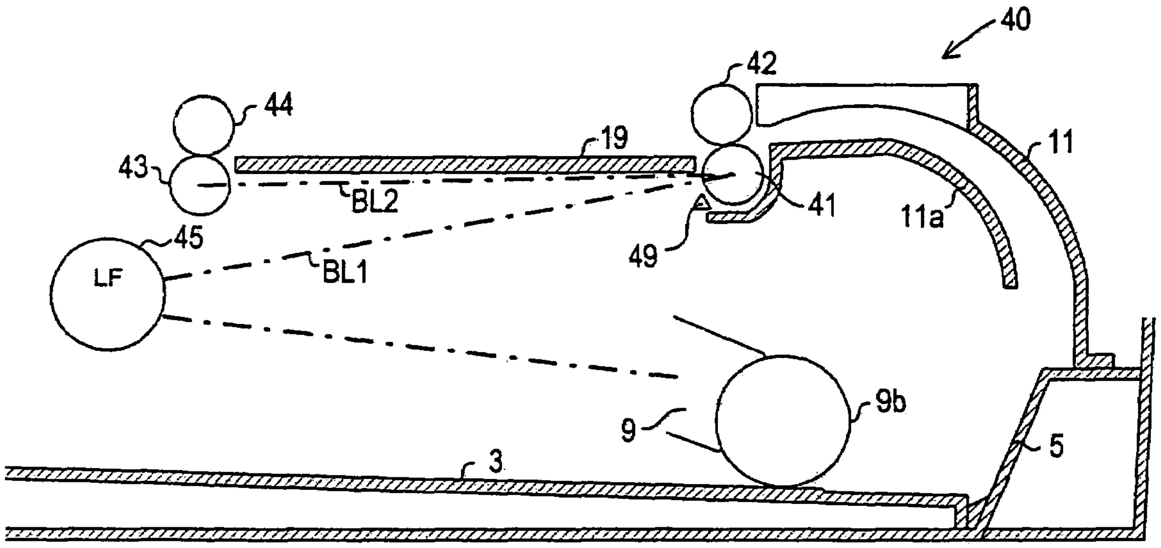
FIG. 11 is an illustrative view of a sheet feeding portion of a sheet feeding system as a second embodiment of the present invention.
Figure 12:
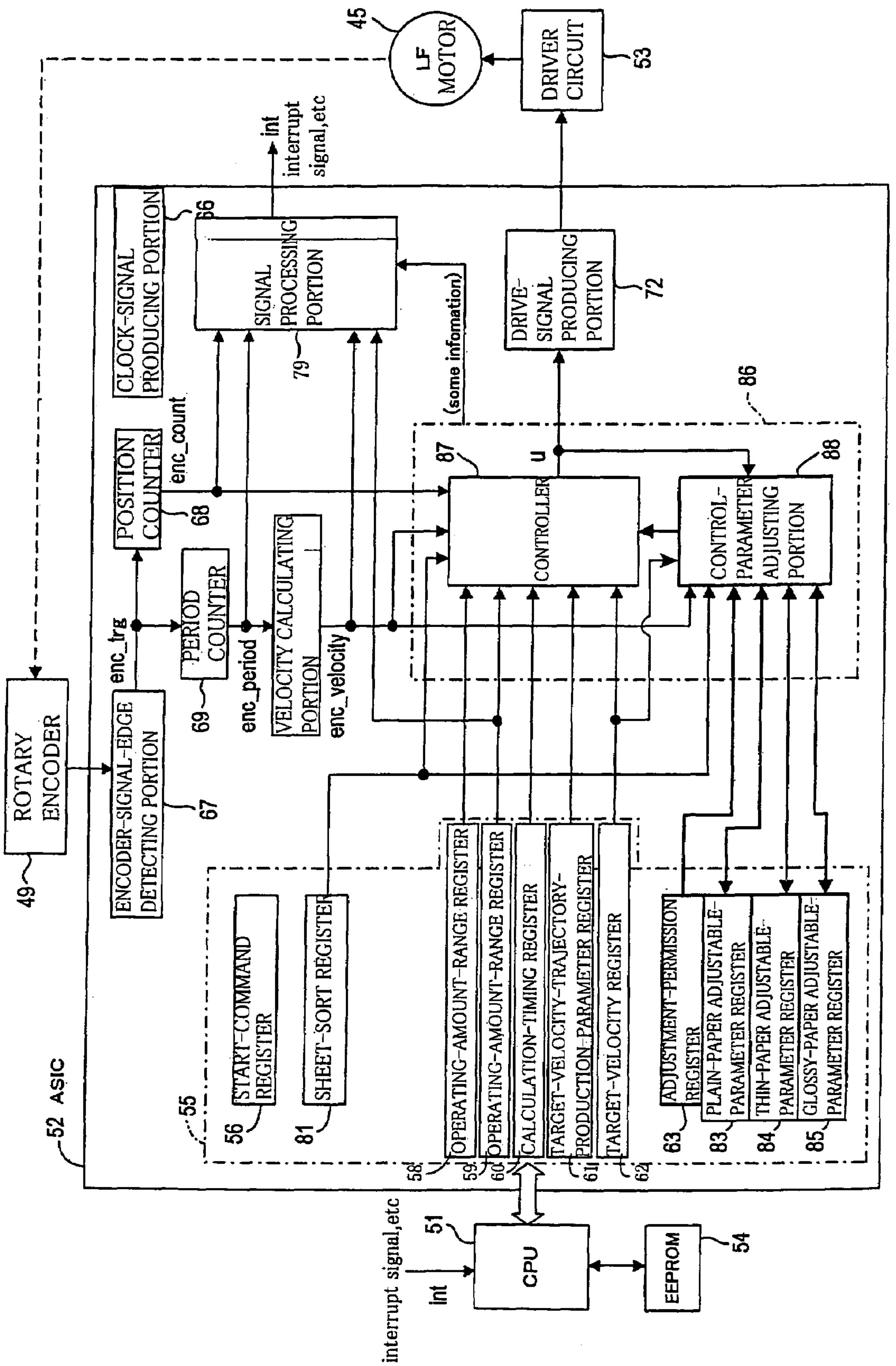
FIG. 12 is a diagrammatic view corresponding to FIG. 4, and showing a sheet-feeding controlling apparatus of the sheet feeding system.

The MFD 1 includes a sheet feeding system as shown in FIG. 11. The sheet feeding system includes a sheet feeding portion (i.e., a sheet feeder) 40, and a sheet-feeding controlling device (FIG. 12). The same reference numerals as used in FIGS. 1 and 2 are used to designate the corresponding elements and parts of the second embodiment, and the description thereof is omitted.

The sheet feeding portion 40 includes a sheet cassette 3 that accommodates a plurality of cut sheets P; a sheet supplying portion 9 that separates and supplies, one by one, the cut sheets P stacked in the sheet cassette 3, i.e., separates the top sheet P from the remaining sheets P and supplies the separated sheet P from the cassette 3; a feeding roller 41 that feeds the cut sheet P supplied by a supplying roller 9*b* of the sheet supplying portion 9, to a position right below a recording head 15; a pinch roller 42 that is opposed to, and is pressed on, the feeding roller 41; a discharging roller 43 that assists the feeding roller 41 in an image recording operation and discharges the cut sheet P on which images have been recorded; a pinch roller (a spur roller) 44 that is opposed to, and is pressed on, the discharging roller 43; an inclined sheet-separate plate 5, a curved sheet guide 11 defining a U-turn path, and a platen 19 that cooperate with each other to define a feeding path including the U-turn path; a line feed (LF) motor 45 as a drive source of each of the feeding roller 41 and the discharging roller 43; and two belts BL1, BL2 each of which transmits a driving force produced by the LF motor 45. Like the CR motor 10, the LF motor 45 is driven or operated by the driver circuit 53, based on various commands supplied from an ASIC 52, as shown in FIG. 12.

An upstream portion of the feeding path defined by the sheet-separate plate 5, the curved sheet guide 11, and the platen 19 controls the movement of the cut sheet P supplied from the sheet cassette 3 by the supplying roller 9*b*, and thereby leads the sheet P to a contact point where the feeding roller 41 and the pinch roller 42 contact each other. The curved sheet guide 11 has, in a downstream portion thereof in the sheet feeding path, an assisting lower portion 11*a* that prevents the sheet P from being moved downward and thereby leads the sheet P to the contact point of the feeding roller 41 and the pinch roller 42.

The platen 19 is provided along a straight line connecting between the feeding roller 41 and the discharging roller 43, and constitutes a downstream portion of the sheet feeding path. The platen 19 leads the cut sheet P fed by the feeding roller 41, to an image-recording position where images are recorded by the recording head 15, and additionally leads the sheet P on which images have been recorded by the head 15, to a contact point where the discharging roller 43 and the pinch roller 44 contact each other. The cut sheet P is fed to the discharging roller 43 along the platen 19. Thus, the sheet P is fed along the above-described feeding path from the upstream portion thereof to the downstream portion thereof, while receiving a driving force from each of the feeding roller 41 and the discharging roller 43.

The LF motor 45 is driven or operated by a driver circuit 53 (FIG. 12), and a driving force of the motor 45 is transmitted to the feeding roller 41 via a first belt, BL1, provided between the LF motor 45 and the feeding roller 41. Thus, the feeding roller 41 is rotated. The driving force of the motor 45, transmitted to the feeding roller 41, is further transmitted from the feeding roller 41 to the discharging roller 43 via a second belt, BL2, provided between the feeding roller 41 and the discharging roller 43. Thus, the discharging roller 43 is rotated with the feeding roller 41 in the same direction as the direction in which the feeding roller 41 is rotated.

The sheet feeding portion 40 includes a rotary encoder 49 that outputs a pulse signal each time the feeding roller 41 is rotated by a predetermined amount or angle, and the outputted pulse signal is inputted to the ASIC 52 functioning as the sheet-feeding controlling device, as shown in FIG. 12. Thus, the MFD 1 determines, based on the pulse signals outputted by the rotary encoder 49, a velocity of rotation of the feeding roller 41, i.e., a velocity of movement of the cut sheet P.

The sheet feeding portion 40 constructed as described above carries out, under the control of the sheet-feeding controlling device (i.e., the ASIC 52) shown in FIG. 12, a sheet-feeding operation in which the cut sheet P is fed from a registration position (i.e., the contact point where the feeding roller 41 and the pinch roller 42 contact each other) toward the discharging roller 43, that is, in which the feeding roller 41 is driven or rotated. The sheet-feeding controlling device (i.e., the ASIC 52) shown in FIG. 12 differs from the carriage-driving controlling device (i.e., the ASIC 52) shown in FIG. 4, in that the sheet-feeding controlling device employs a different operation-mode register group 55 and a different control portion 86 (in particular, a different control-parameter adjusting portion 88).

In the second embodiment, the operation-mode register group 55 includes a sheet-sort register 81 that stores information representing a sort of a cut sheet P to be fed; and a plurality of adjustable-parameter registers corresponding to a plurality of sorts of cut sheets to be fed, i.e., (a) a plain-paper register 83 that stores a plain-paper-related adjustable parameter that is used and adjusted when a plain-paper cut sheet P is fed, (b) a thin-paper register 84 that stores a thin-paper-related adjustable parameter that is used and adjusted when a thin-paper cut sheet P is fed, and (c) a glossy-paper register 85 that stores a glossy-paper-related adjustable parameter that is used and adjusted when a glossy-paper cut sheet P is fed. A user can select an arbitrary one of the plain-paper cut sheet P, the thin-paper cut sheet P, and the glossy-paper cut sheet P by operating an appropriate key or keys of the operation panel 29. The sheet-sort register 81 stores information representing the sort of the cut sheet P selected by the user through the operation panel 29.

When a sheet-feeding operation is carried out, the control-parameter adjusting portion 88 obtains, from the operation-mode register group 55, the adjustable parameter corresponding to the sheet sort represented by the information stored by the sheet-sort register 81, and inputs the thus obtained adjustable parameter, to a controller 87. In addition, during the sheet-feeding operation, the control-parameter adjusting portion 88 iteratively adjusts, at each of appropriate timings, the obtained adjustable parameter and inputs the thus adjusted, new adjustable parameter to the controller 87.

The controller 87 calculates motor operating amounts each to operate the LF motor 45, in the same manner as described above in connection with the controller 75 of the carriage-driving controlling device shown in FIG. 4. In addition, the control-parameter adjusting portion 88 adjusts the adjustable parameter in the same manner as described above in connection with the control-parameter adjusting portion 77 of the carriage-driving controlling device.

Figure 13:
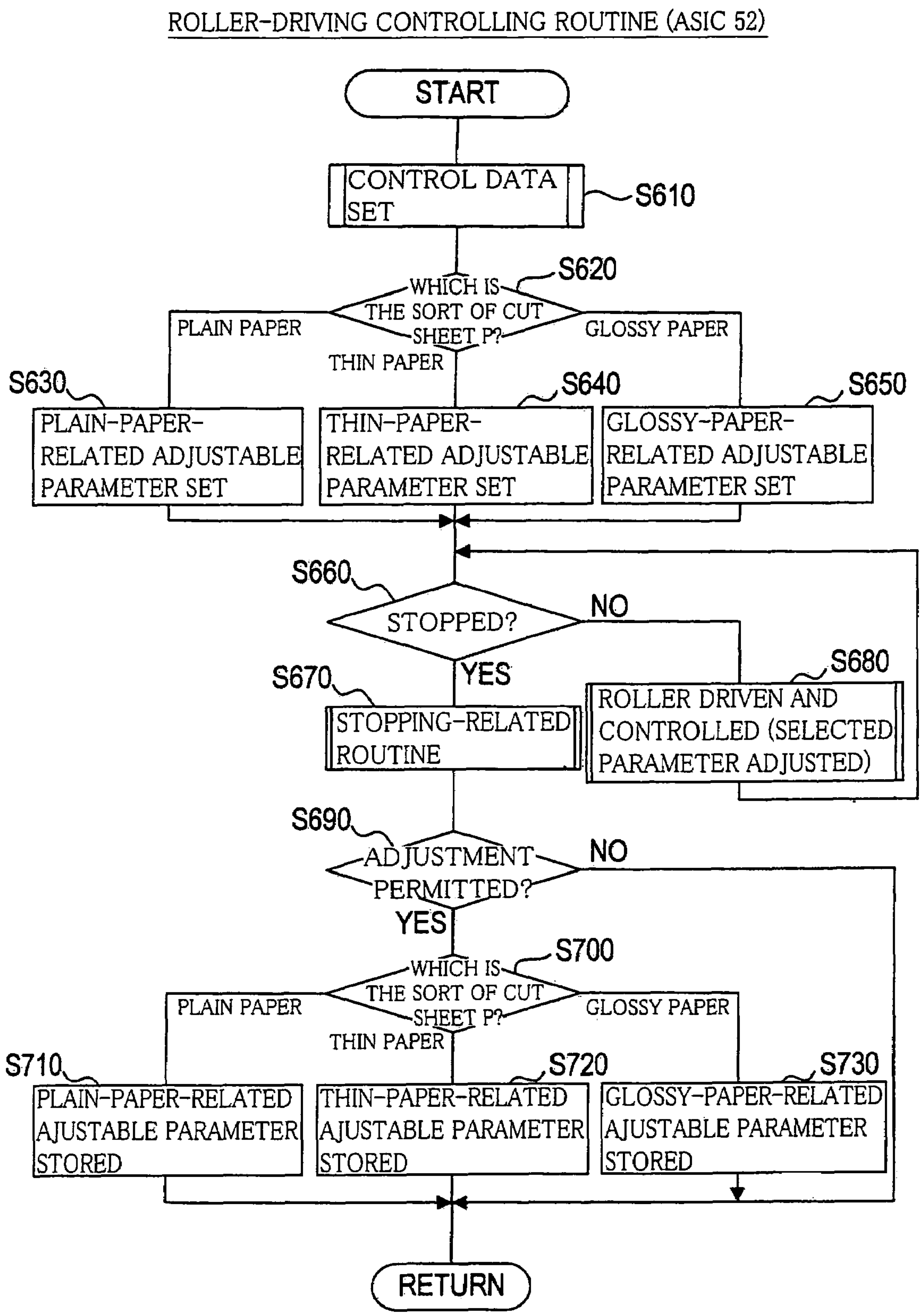
FIG. 13 is a flow chart representing a sheet-feeding controlling routine carried out by an ASIC of the sheet-feeding controlling apparatus.

FIG. 13 is a flow chart representing a roller-driving controlling routine. When the roller-driving controlling routine is carried out, first, at Step S610, the ASIC 52 sets various information (e.g., various parameters) needed to operate the LF motor 45 and thereby rotate the feeding roller 41. Then, at Step S620, based on the information (e.g., a value) stored in the sheet-sort register 81, it is judged which sort of cut sheet P is to be fed. In the case where the judged sheet sort is the plain paper, the control of the ASIC 52 goes to Step S630 to select the plain-paper-related adjustable parameter stored by the plain-paper register 83; in the case where the judged sheet sort is the thin paper, the control goes to Step S640 to select the thin-paper-related adjustable parameter stored by the thin-paper register 84; and in the case where the judged sheet sort is the glossy paper, the control goes to Step S650 to select the glossy-paper-related adjustable parameter stored by the glossy-paper register 85. Steps S620 through 650 are carried out by the control-parameter adjusting portion 88.

Then, at Step S660, it is judged whether the cut sheet P has reached a stopping position. If a positive judgment is made at Step S660, the control goes to Step S670 to carry out an appropriate stopping routine. However, if a negative judgment is made at Step S660, the control goes to Step S680 to start a roller-driving controlling routine. While the roller-driving controlling routine is carried out, i.e., while the feeding roller 41 is driven or rotated by the LF motor 45, the one adjustable parameter ($\beta_a$, $\beta_b$, or $\beta_c$) selected by the control-parameter adjusting portion 88 is iteratively adjusted by the same 88 at each of appropriate timings, under a condition that an adjustment permission is set in an adjustment-permission register 63. The concrete method in which the adjustable parameter is iteratively adjusted has been described above using the equations (1) through (20).

If the cut sheet P is fed by an amount corresponding to one line of images and the rotation of the feeding roller 41 is stopped, the control goes to Step S690 to judge whether the adjustment of the selected adjustable parameter is permitted, i.e., whether the adjustment permission is set in the adjustment-permission register 63. If a negative judgment is made at Step S690, the current control cycle of the roller-driving controlling routine of FIG. 13 is ended. On the other hand, if a positive judgment is made at Step S690, the control goes to Step S700 to identify which sort of the cut sheet P has been fed before being stopped. In the case where the plain-paper cut sheet P has been fed, the control goes to Step S710 to store the last adjusted (i.e., newest) value of the selected adjustable parameter in the plain-paper adjustable parameter register 83; in the case where the thin-paper cut sheet P has been fed, the control goes to Step S720 to store the last adjusted value of the selected adjustable parameter in the thin-paper adjustable parameter register 84; and in the case where the glossy-paper cut sheet P has been fed, the control goes to Step S730 to store the last adjusted value of the selected adjustable parameter in the glossy-paper adjustable parameter register 85.

In the MFD 1 constructed as described above, the different adjustable parameters respectively corresponding to the different sorts of the cut sheets P (e.g., plain paper, thin paper, and glossy paper) are employed, and each one of the different adjustable parameters is used when a corresponding one of the different sorts of cut sheets P is fed. Therefore, the feeding portion 40 can feed any sort of cut sheet P in an appropriate manner.

Other Embodiments

In the above-described first embodiment, the carriage 17 is reciprocated, i.e., is moved in each of the different directions, i.e., under each of the different operating conditions corresponding to the different dynamic characteristics of the image recording portion 13; and in the above-described second embodiment, the feeding roller 41 feeds each of the different sorts of cut sheets P as the different operating conditions corresponding to the different dynamic characteristics of the sheet feeding portion 40. However, those embodiments are just examples, and the present invention can be applied to any sort of motor controlling apparatus that controls an electric motor as a drive source of an operating apparatus, under each one of different operating conditions corresponding to different dynamic characteristics of the operating apparatus. It goes without saying that the present invention is not limited to the MFD 1.

For example, the present invention can be applied to such a case where an electric motor moves an object along a movement path in one direction only, but respective dynamic characteristics of the object with respect to first and second halves of the movement path differ from each other. That is, two different adjustable parameters corresponding to the first and second halves of the movement path are employed, and an appropriate one of the two adjustable parameters is selected and adjusted. Thus, the object can be driven in an appropriate manner over the entire movement path.

In the above-described first embodiment, each time the carriage 17 is reciprocated, the adjustable parameters $\alpha_a$, $\alpha_b$ stored in the registers 64, 65 are updated; and after one job is finished, the adjustable parameters $\alpha_a$, $\alpha_b$ stored in the EEPROM 54 are replaced with the last updated adjustable parameters $\alpha_a$, $\alpha_b$ stored in the registers 64, 65. However, the present invention is not limited to this updating manner. For example, the ASIC 52 may be operated such that the adjustable parameters $\alpha_a$, $\alpha_b$ stored in the registers 64, 65 are not updated till one job is finished and, after one job is finished, the adjustable parameters $\alpha_a$, $\alpha_b$ stored in the registers 64, 65 are updated to the last updated adjustable parameters $\alpha_a$, $\alpha_b$ and simultaneously the adjustable parameters $\alpha_a$, $\alpha_b$ stored in the EEPROM 54 are replaced with the last updated adjustable- parameters $\alpha_a$, $\alpha_b$ stored in the registers 64, 65.

Moreover, the method of adjusting the adjustable parameters $\alpha$, $\beta$ is not limited to the above-described model reference adaptive control (MRAC) method, but may be any one of various sorts of adaptive control methods. In those cases, it is advantageous to employ a plurality of adjustable parameters corresponding to different operating conditions of an object to be controlled. For example, in a self-tuning control method, it is possible to adjust each of a plurality of adjustable parameters.

Figure 14:
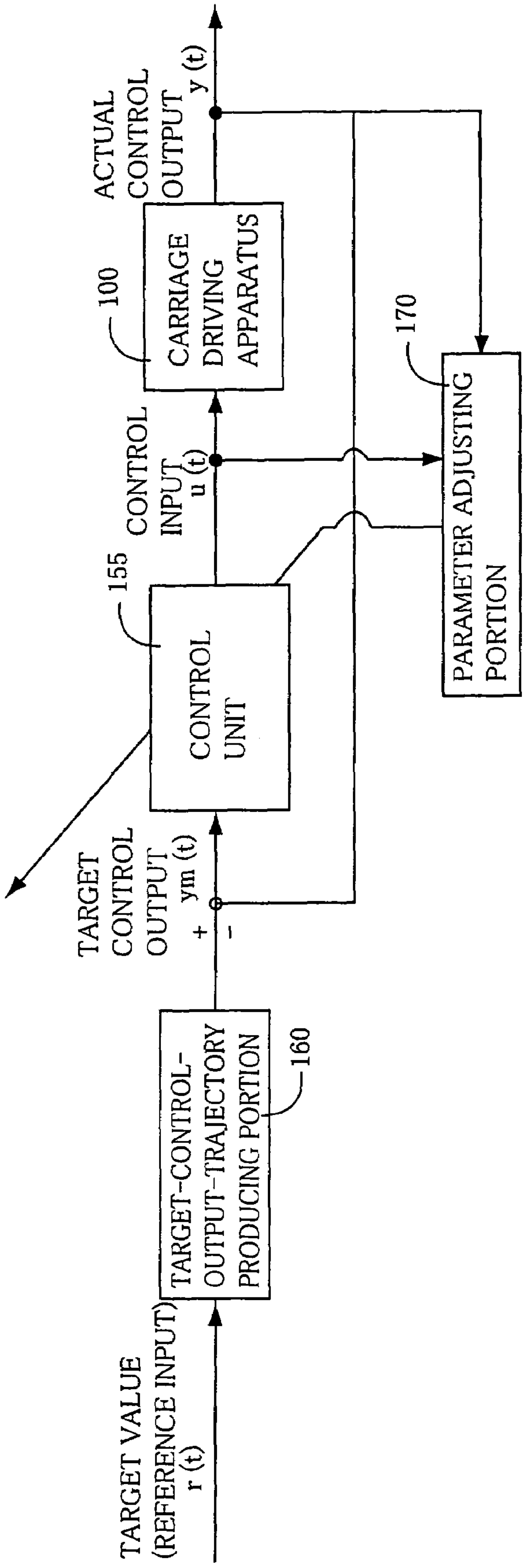
FIG. 14 is a schematic view for explaining a self-tuning control method employed by another carriage driving and controlling apparatus as a third embodiment of the present invention.
Figure 15:
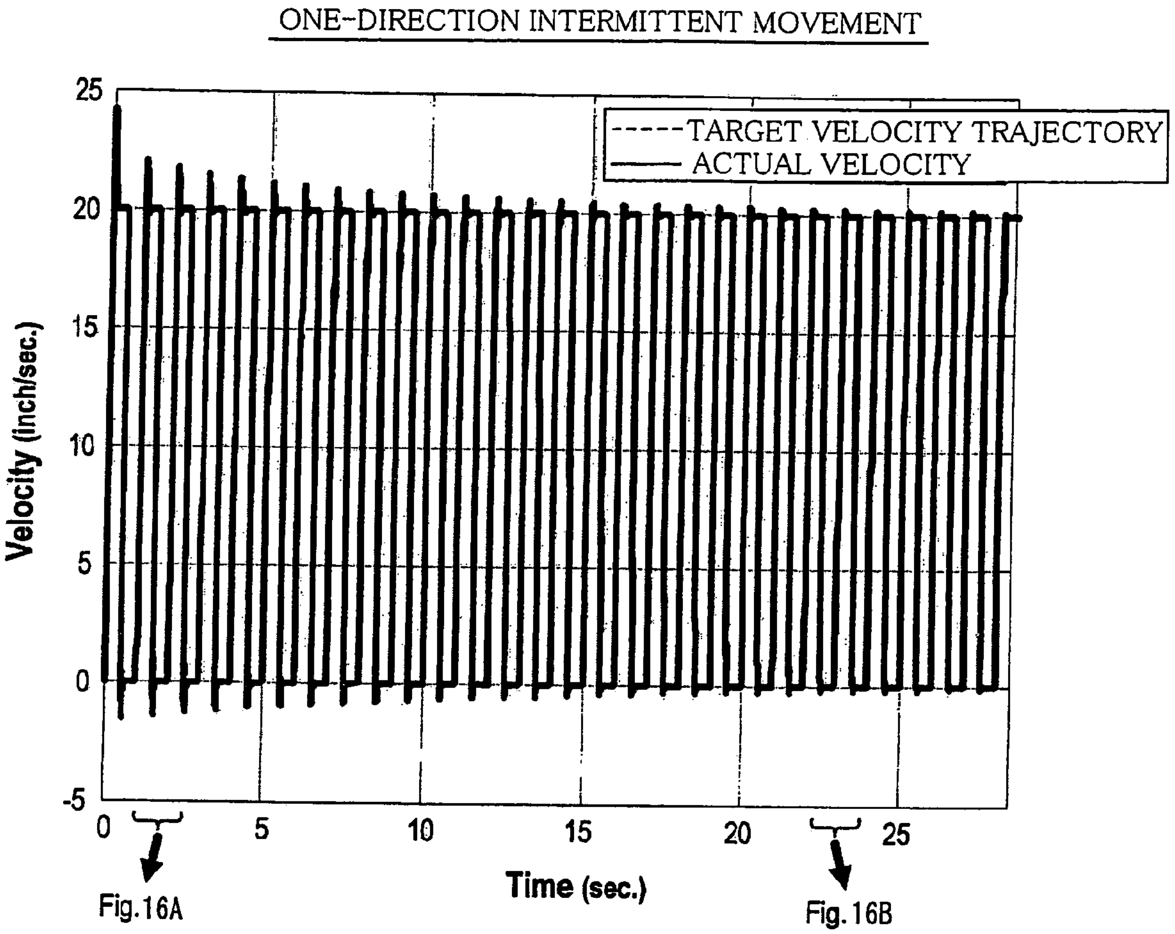
FIG. 15 is a graph representing a target velocity trajectory, and a time-wise change of an actual velocity of an object (e.g., a carriage) when the object is moved in one direction, iteratively at regular intervals of time.
Figure 16A:
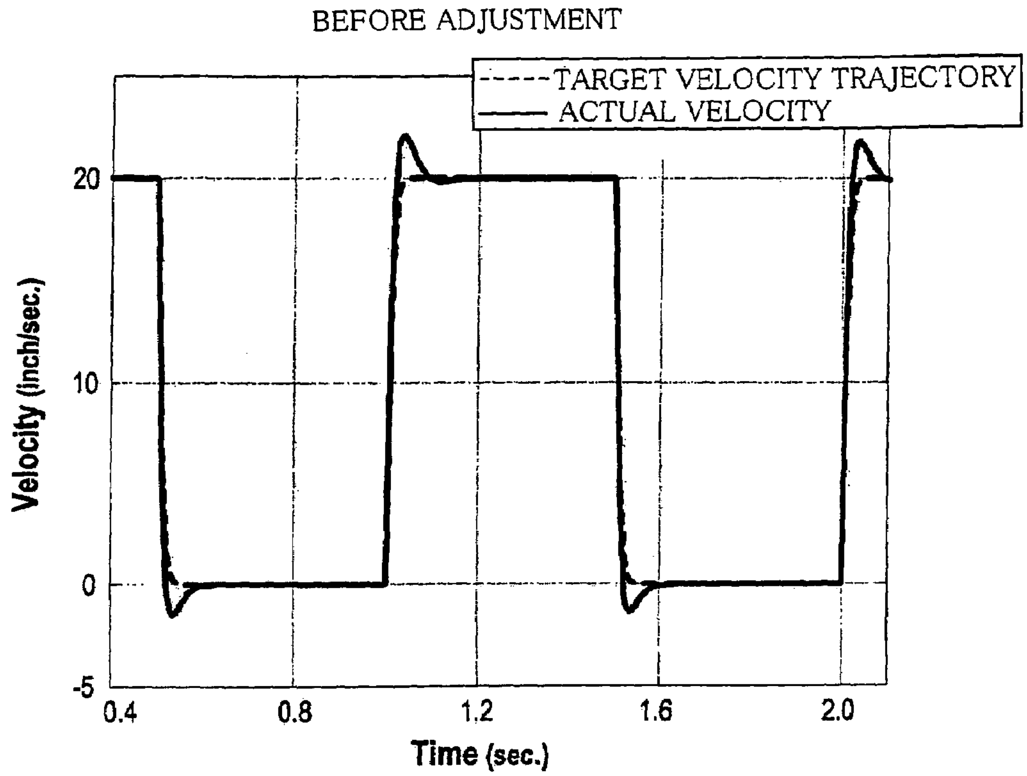
FIG. 16A is an enlarged view of a first portion of the graph of FIG. 15 that corresponds to a time period from 0.4 second to about 2.0 seconds.
Figure 16B:
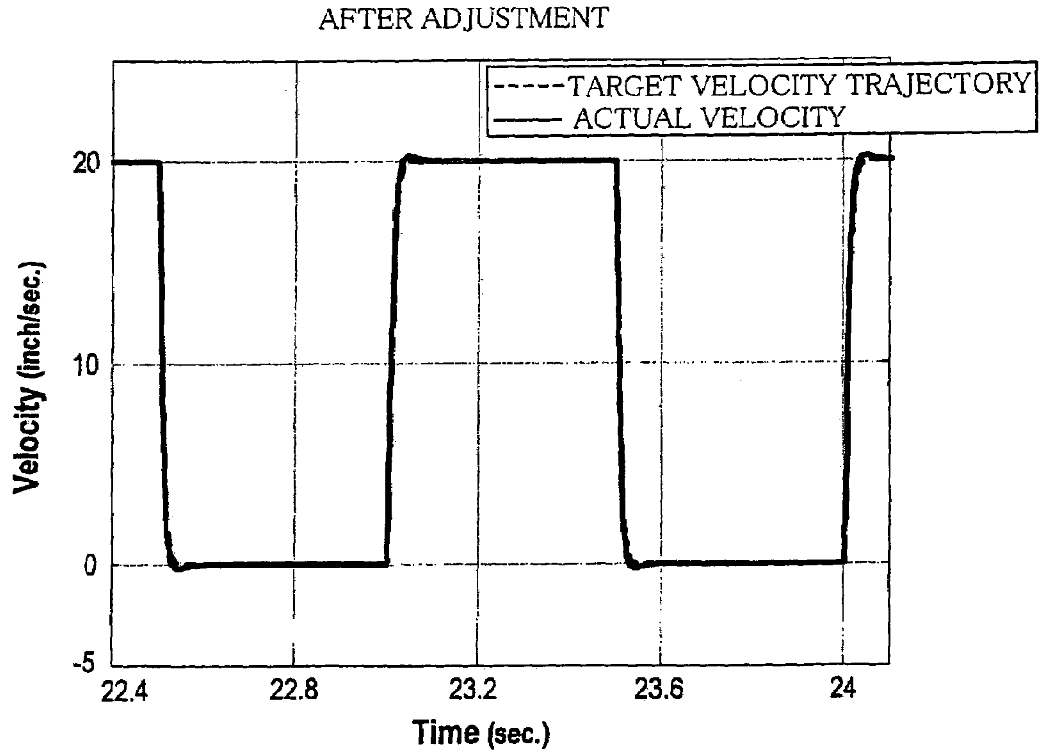
FIG. 16B is an enlarged view of a second portion of the graph of FIG. 15 that corresponds to a time period from 22.4 seconds to about 24 seconds.

As schematically shown in FIG. 14, the self-tuning control method uses, as an input to a control unit 155 that controls the carriage driving apparatus 100 as the controlled object, a difference of (a) a target control output trajectory $y_m(t)$ produced by a target-control-output-trajectory producing portion 160 based on a target value r(t) inputted thereto, and (b) an actual control output trajectory y(t), and a parameter adjusting portion 170 adjusts an adjustable parameter, $\gamma$, as one of control parameters used by the control unit 155. More specifically described, the parameter adjusting portion 170 identifies, based on a control input u(t) and an actual control output y(t), an internal parameter of the carriage driving apparatus 100, and adjusts the adjustable parameter $\gamma$ as one control parameter of the control unit 155, such that the carriage driving apparatus 100 having the identified parameter provides an appropriate control output y(t). The target-control-output-trajectory producing portion 160 may employ the same reference model, M(s), as used in the above-described model reference adaptive control method. The control unit 155 may be a PID control unit that uses, as the control parameters, a proportional gain, an integral gain, and a derivative gain all for the PID control. At least one sort of those control parameters may be selected as the adjustable parameter $\gamma$. The parameter adjusting portion 170 adjusts the adjustable parameter $\gamma$, such that a difference, $\{y_m(t)-y(t)\}$, of the target control output trajectory $y_m(t)$ and the actual control output trajectory y(t) is minimized. Since the adjustable parameter $\gamma$ is iteratively adjusted and the control input u(t) to the carriage driving apparatus 100 is iteratively determined, using the iteratively adjusted adjustable parameter $\gamma$, by the control unit 155 based on the difference $\{y_m(t)-y(t)\}$, the adjustable parameter $\gamma$ is eventually adjusted to a value assuring that the actual control output trajectory y(t) substantially coincides with the target control output trajectory $y_m(t)$. In a preferred embodiment of the present invention, two adjustable parameters $\gamma a$, $\gamma b$ corresponding to the two directions (i.e., the forward and backward directions) in which the carriage 17 is moved, respectively, are employed, and each one of the two adjustable parameters $\gamma a$, $\gamma b$ is adjusted when the carriage 17 is moved in a corresponding one of the two directions.

In a modified form of the embodiment shown in FIG. 14, the carriage driving apparatus 100 is replaced with a recording-medium feeding apparatus (e.g., the LF motor 45, the rollers **9*b*, 41, 43, and the endless belts BL1, BL2). In this case, a plurality of adjustable parameters $\delta$ corresponding to a plurality of sorts of recording media are used in controlling an electric motor of the recording-medium feeding apparatus (e.g., the LF motor 45**), and each of the adjustable parameters $\delta$ is adjusted while a corresponding one of the different sorts of recording media is fed by the recording-medium feeding apparatus.

It is to be understood that the present invention may be embodied with various changes, modifications, and improvements that may occur to a person skilled in the art without departing from the spirit and scope of the invention defined in the appended claims.

What is claimed is:

1. A method of controlling an electric motor as a drive source of an operating apparatus by an adaptive control method, the operating apparatus operating, based on a driving force produced by the electric motor, under an arbitrary one of a plurality of operating conditions, and exhibiting a plurality of different dynamic characteristics corresponding to the plurality of operating conditions, respectively, the method comprising:

preparing, for a control portion controlling the electric motor, a plurality of control-parameter groups which correspond to the plurality of operating conditions, respectively, and each group of which includes at least one control parameter comprising at least one adjustable parameter, determining, based on one of the control-parameter groups that corresponds to the arbitrary one of the operating conditions, and a plurality of target control outputs of the operating apparatus that correspond to a plurality of times, respectively, a plurality of control inputs to be inputted to the electric motor at the plurality of times, respectively, and while the operating apparatus operates under one of the operating conditions that corresponds to each one of the control-parameter groups, adjusting said at least one adjustable parameter of said each control-parameter group in a direction in which an actual control-output trajectory, including a plurality of actual control outputs of the operating apparatus, approaches a target control-output trajectory including the plurality of target control outputs of the operating apparatus, wherein the plurality of actual control outputs of the operating apparatus correspond to the plurality of control inputs, respectively.

2. The method according to claim 1, wherein said adjusting comprises obtaining the plurality of actual control outputs of the operating apparatus that correspond to the plurality of control inputs, respectively, and adjusting said at least one adjustable parameter of said each control-parameter group in a direction in which a deviation of the actual control-output trajectory including the obtained actual control outputs, from the target control-output trajectory, is decreased.

3. The method according to claim 1, wherein said adjusting comprises adjusting, at a predetermined time period, said at least one adjustable parameter of said each control-parameter group in a direction in which a deviation of the actual control-output trajectory from the target control-output trajectory is decreased.

4. The method according to claim 1, wherein said adjusting comprises preparing a reference model whose output trajectory is to become equal to the target control-output trajectory, and adjusting said at least one adjustable parameter of said each control-parameter group in a direction in which an operation characteristic of a closed loop including the control portion and the operating apparatus approaches a transfer characteristic of the reference model, whereby the electric motor is controlled by a model reference adaptive control method.

5. The method according to claim 1, further comprising permitting said adjusting when a first predetermined condition has been met, and not permitting said adjusting when the first predetermined condition has not been met.

6. A motor controlling apparatus for controlling an electric motor as a drive source of an operating apparatus by an adaptive control, the operating apparatus operating, based on a driving force produced by the electric motor, under an arbitrary one of a plurality of operating conditions, and exhibiting a plurality of different dynamic characteristics corresponding to the plurality of operating conditions, respectively, the apparatus comprising:

an adjustable-parameter memory which stores a plurality of adjustable parameters comprising at least one adjustable parameter as at least one control parameter belonging to each one of a plurality of control-parameter groups corresponding to the plurality of operating conditions, respectively, such that said at least one adjustable parameter belonging to said each control-parameter group is associated with a corresponding one of the operating conditions;

a motor control portion which determines, based on one of the control-parameter groups that corresponds to the arbitrary one of the operating conditions, and a plurality of target control outputs of the operating apparatus that correspond to a plurality of times, respectively, a plurality of control inputs to be inputted to the electric motor at the plurality of times, respectively, and inputs the determined control inputs to the electric motor at the respective times; and a parameter adjusting portion, wherein while the operating apparatus operates under said one of the operating conditions that corresponds to said each control-parameter group, the parameter adjusting portion adjusts said at least one adjustable parameter of said each control-parameter group in a direction in which an actual control-output trajectory including a plurality of actual control outputs of the operating apparatus approaches a target control-output trajectory including the plurality of target control outputs of the operating apparatus, wherein the plurality of actual control outputs of the operating apparatus correspond to the plurality of control inputs, respectively.

7. The motor controlling apparatus according to claim 6, wherein the parameter adjusting portion comprises:

an actual-output obtaining portion which obtains the plurality of actual control outputs of the operating apparatus that correspond to the plurality of control inputs, respectively; and a deviation-decrease adjusting portion which adjusts said at least one adjustable parameter of said each control-parameter group in a direction in which a deviation of the actual control-output trajectory including the actual control outputs obtained by the actual-output obtaining portion, from the target control-output trajectory, is decreased.

8. The motor controlling apparatus according to claim 6, wherein the parameter adjusting portion comprises a deviation-decrease adjusting portion which iteratively adjusts said at least one adjustable parameter of said each control-parameter group in a direction in which a deviation of the actual control-output trajectory from the target control-output trajectory is decreased.

9. The motor controlling apparatus according to claim 6, wherein the parameter adjusting portion adjusts, based on a reference model whose output trajectory is to become equal to the target control-output trajectory, said at least one adjustable parameter of said each control-parameter group in a direction in which an operation characteristic of a closed loop including the motor control portion and the operating apparatus approaches a transfer characteristic of the reference model, whereby the electric motor is controlled by a model reference adaptive control.

10. The motor controlling apparatus according to claim 6, further comprising an adjusting-portion control portion which permits, when a first predetermined condition has been met, the parameter adjusting portion to adjust said at least one adjustable parameter, and does not permit, when the first predetermined condition has not been met, the parameter adjusting portion to adjust said at least one adjustable parameter.

11. The motor controlling apparatus according to claim 6, wherein the parameter adjusting portion comprises a repeating portion which repeats, at a predetermined time period, an adjustment of said at least one adjustable parameter.

12. The motor controlling apparatus according to claim 6, wherein the parameter adjusting portion comprises an ending portion which ends an adjustment of said at least one adjustable parameter of said each control-parameter group when a second predetermined condition has been met.

13. The motor controlling apparatus according to claim 12, wherein the second predetermined condition comprises a fact that an operation of the operating apparatus under said one operating condition has ended.

14. The motor controlling apparatus according to claim 12, further comprising an updating portion which updates, when the ending portion ends the adjustment of said at least one adjustable parameter of said each control-parameter group, said at least one adjustable parameter of said each control-parameter group, stored by the adjustable-parameter memory, to a value of said at least one adjustable parameter of said each control-parameter group when the ending portion ends said adjustment.

15. The motor controlling apparatus according to claim 6, wherein the parameter adjusting portion comprises a before-operation adjusting portion which adjusts said at least one adjustable parameter of said each control-parameter group before a proper operation of the operating apparatus starts.

16. The motor controlling apparatus according to claim 6, further comprising a parameter storing portion which stores, in a non-volatile memory, said at least one adjustable parameter of said each control-parameter group, adjusted by the parameter adjusting portion, such that the adjusted at least one adjustable parameter of said each control-parameter group is associated with said corresponding operating condition.

17. The motor controlling apparatus according to claim 16, wherein the parameter storing portion comprises an operation-end-timing storing portion which stores, in the non-volatile memory, said at least one adjustable parameter of said each control-parameter group, when a unit operation of the operating apparatus ends.

18. The motor controlling apparatus according to claim 6, further comprising an operation selecting portion which can select whether the parameter adjusting portion is to be operated to adjust said at least one adjustable parameter, or not to be operated.

19. The motor controlling apparatus according to claim 6, further comprising a parameter-group selecting portion which selects, when the electric motor is operated, one of the control-parameter groups that corresponds to a current one of the operating conditions, wherein the motor control portion controls the electric motor based on said at least one control parameter belonging to the control-parameter group selected by the parameter-group selecting portion.

20. A recording apparatus, comprising:

a carriage;

a carriage moving device which includes, as a drive source thereof, an electric motor, and which reciprocates the carriage in a main scan direction;

a medium feeding device which feeds a recording medium in a sub-scan direction perpendicular to the main scan direction;

a recording head which is mounted on the carriage and which records an image on the recording medium while being moved in the main scan direction; and a control device which controls the carriage moving device, the medium feeding device, and the recording head, wherein the control device comprises a motor control portion including a direction-dependent control portion which controls the electric motor based on each one of two different control parameters corresponding to (a) a first operation of the electric motor to cause the carriage moving device to move the carriage in one of opposite directions of the main scan direction, and (b) a second operation of the electric motor to cause the carriage moving device to move the carriage in an other of the opposite directions, respectively.

21. A recording apparatus, comprising:

a medium feeding device which includes, as a drive source thereof, an electric motor, and which feeds a recording medium;

a recording head which records an image on the recording medium fed by the medium feeding device; and a control device which controls the medium feeding device and the recording head, wherein the control device comprises a selected-medium-sort obtaining portion which obtains one of a plurality of sorts of recording media that has been selected to be fed by the medium feeding device, and a motor control portion including a medium-sort-dependent control portion which selects, based on the medium sort obtained by the selected-medium-sort obtaining portion, one of a plurality of control parameters corresponding to the plurality of sorts of recording media, respectively, and which controls, based on the selected control parameter, the electric motor.

22. The recording apparatus according to claim 20, wherein the direction-dependent control portion comprises:

a parameter memory which stores the two different control parameters;

a motor control portion which determines, based on said each one of the two different control parameters, and a plurality of target control outputs of the carriage moving device that correspond to a plurality of times, respectively, a plurality of control inputs to be inputted to the electric motor at the plurality of times, respectively, and inputs the determined control inputs to the electric motor at the respective times; and a parameter adjusting portion, wherein while the carriage moving device moves the carriage in each one of the opposite directions of the main scan direction, the parameter adjusting portion which adjusts a corresponding one of the two different control parameters in a direction in which an actual control-output trajectory including a plurality of actual control outputs of the carriage moving device approaches a target control-output trajectory including the plurality of target control outputs of the carriage moving device, wherein the plurality of actual control outputs correspond to the plurality of control inputs, respectively.

23. The recording apparatus according to claim 21, wherein the medium-sort-dependent control portion comprises:

a parameter memory which stores the plurality of control parameters;

a motor control portion which determines, based on each one of the plurality of control parameters, and a plurality of target control outputs of the medium feeding device that correspond to a plurality of times, respectively, a plurality of control inputs to be inputted to the electric motor at the plurality of times, respectively, and inputs the determined control inputs to the electric motor at the respective times; and a parameter adjusting portion, wherein while the medium feeding device feeds each one of the plurality of sorts of recording media, the parameter adjusting portion which adjusts a corresponding one of the plurality of control parameters in a direction in which an actual control-output trajectory including a plurality of actual control outputs of the medium feeding device approaches a target control-output trajectory including the plurality of target control outputs of the medium feeding device, wherein the plurality of actual control outputs of the medium feeding device correspond to the plurality of control inputs, respectively.

24. A reciprocating apparatus, comprising:

an electric motor;

a control device which controls the electric motor;

a drive pulley which is driven by the electric motor;

a follower pulley;

an endless transmission member which is wound on the drive pulley and the follower pulley; and a driven portion which is connected to a portion of the endless transmission member and which is reciprocated when the electric motor is rotated in a forward direction and a backward direction, wherein the control device comprises:

an adjustable-parameter memory which stores a plurality of adjustable parameters, wherein each one of two control-parameter groups corresponding to the respective rotations of the electric motor in the forward and backward directions includes at least one adjustable parameter, such that said at least one adjustable parameter belonging to said each one control-parameter group is associated with a corresponding one of the forward and backward directions;

a motor control portion which determines, based on said each one of the two control-parameter groups, and a plurality of target control outputs of the reciprocating apparatus that correspond to a plurality of times, respectively, a plurality of control inputs to be inputted to the electric motor at the plurality of times, respectively, and inputs the determined control inputs to the electric motor at the respective times; and a parameter adjusting portion, wherein while when the electric motor is rotated in each one of the forward and backward directions, the parameter adjusting portion which adjusts said at least one adjustable parameter of a corresponding one of the two control-parameter groups in a direction in which an actual control-output trajectory including a plurality of actual control outputs of the reciprocating apparatus approaches a target control-output trajectory including the plurality of target control outputs of the reciprocating apparatus, wherein the plurality of actual control correspond to the plurality of control inputs, respectively.

* * * * *